(12) United States Patent
Kotani et al.

(10) Patent No.: US 10,919,399 B2
(45) Date of Patent: Feb. 16, 2021

(54) VEHICLE SYSTEM

(71) Applicant: DAIHEN Corporation, Osaka (JP)

(72) Inventors: Hiroyuki Kotani, Osaka (JP); Masao Yokota, Osaka (JP)

(73) Assignee: DAIHEN Corporation, Osaka (JP)

( * ) Notice: Subject to any disclaimer, the term of this patent is extended or adjusted under 35 U.S.C. 154(b) by 567 days.

(21) Appl. No.: 15/581,044

(22) Filed: Apr. 28, 2017

(65) Prior Publication Data

US 2017/0326995 A1 Nov. 16, 2017

(30) Foreign Application Priority Data

May 12, 2016 (JP) ................................. 2016-096104

(51) Int. Cl.
*B60L 50/40* (2019.01)
*B60L 53/12* (2019.01)
(Continued)

(52) U.S. Cl.
CPC ............. *B60L 50/40* (2019.02); *B60L 11/182* (2013.01); *B60L 53/12* (2019.02); *B60L 53/122* (2019.02);
(Continued)

(58) Field of Classification Search
USPC .......................................................... 701/22
See application file for complete search history.

(56) References Cited

U.S. PATENT DOCUMENTS

2003/0044319 A1* 3/2003 Itoh .................. G01N 35/04
422/63
2007/0070082 A1* 3/2007 Brennan ............... G06T 15/503
345/592

(Continued)

FOREIGN PATENT DOCUMENTS

JP   2005-261172 A   9/2005
JP   2008-236997 A   10/2008
(Continued)

OTHER PUBLICATIONS

Novel EV Society Based on Motor / Capacitor / Wireless . . . , Yoichi Hori, InSpec Accession No. 12804187, ISBN 978-1-4673-1780-1, DOI 10.1109/IMWS.2012.6215827, 2012 IEEE MTT-S International Microwave Workshop Series on Innovative Wireless Power Transmission . . . , Kyoto, Japan, May 10-11, 2012 (Year: 2012).*

(Continued)

*Primary Examiner* — Kimberly S Berona
*Assistant Examiner* — Andy Schneider
(74) *Attorney, Agent, or Firm* — Hamre, Schumann, Mueller & Larson, P.C.

(57) ABSTRACT

A vehicle system provided according to one aspect of the present disclosure includes a power transmitter and a vehicle. The power transmitter is placed at one of at least one charge position. The vehicle includes: a power receiver, a capacitor, and a motor. The power receiver wirelessly receives first electric power from the power transmitter, and outputs second electric power deriving from the first electric power. The capacitor stores the second electric power output by the power receiver such that the capacitor is charged from a first voltage Vc1 to a second voltage Vc2. The motor is driven by the second electric power from the capacitor. The vehicle automatically travels a distance Dx along a route from one to a next one of the at least one charge position on the route. The distance Dx satisfies a certain relationship.

13 Claims, 11 Drawing Sheets

Figure 1A:
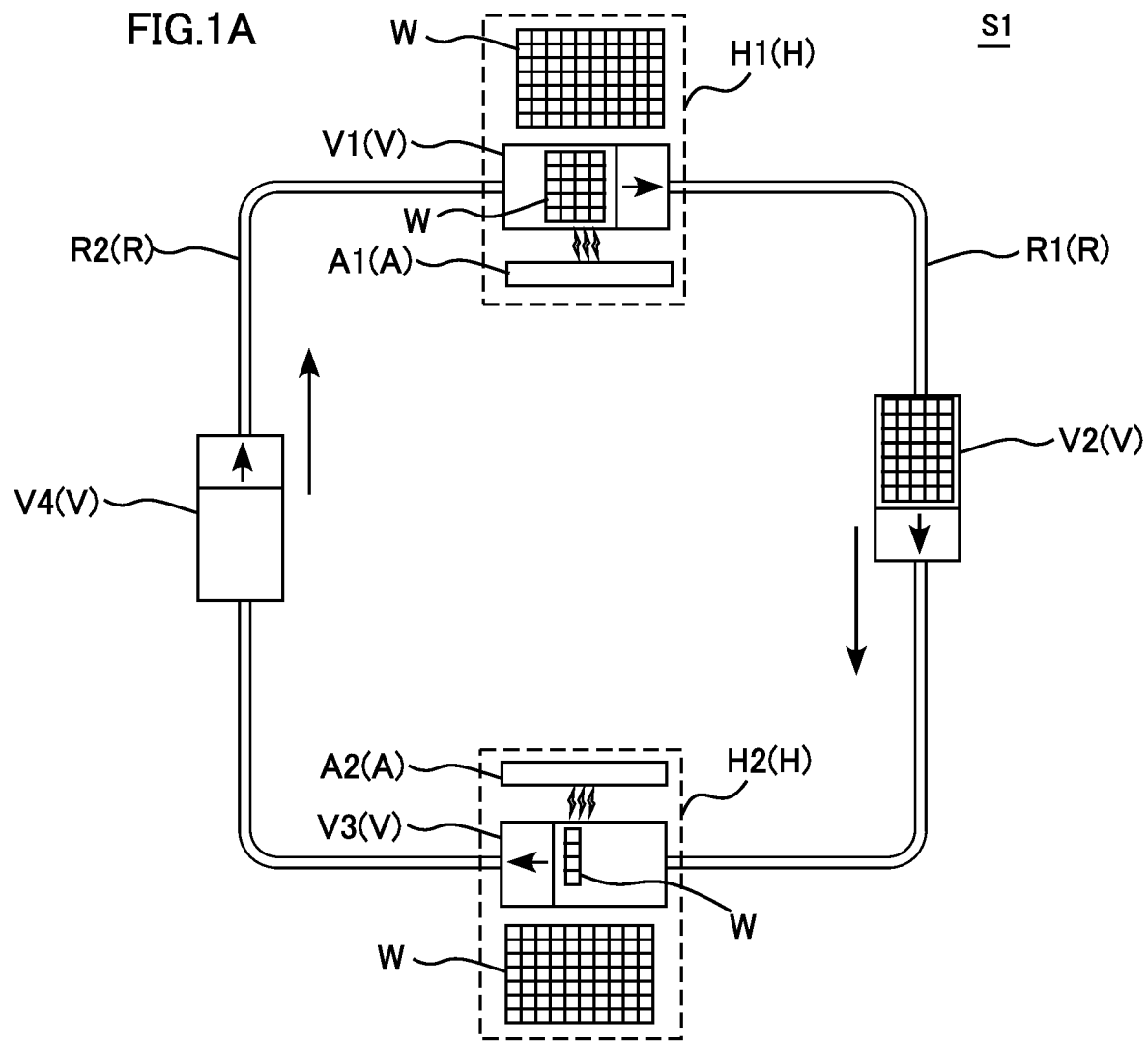

(51) Int. Cl.
*B60L 53/122* (2019.01)
*B60L 53/30* (2019.01)
*H02J 50/12* (2016.01)
*B65G 47/90* (2006.01)
*G05D 1/00* (2006.01)
*H02M 1/14* (2006.01)
*H02J 7/34* (2006.01)
*B60L 53/38* (2019.01)
*G05D 1/02* (2020.01)
*B60L 53/55* (2019.01)
*B60L 53/126* (2019.01)
*H02J 7/00* (2006.01)
*B60L 53/20* (2019.01)
*B60P 1/48* (2006.01)
*H02M 3/335* (2006.01)
*B60L 11/18* (2006.01)

(52) U.S. Cl.
CPC ............. *B60L 53/126* (2019.02); *B60L 53/20* (2019.02); *B60L 53/32* (2019.02); *B60P 1/48* (2013.01); *B65G 47/90* (2013.01); *B65G 47/904* (2013.01); *G05D 1/0088* (2013.01); *H02J 7/00* (2013.01); *H02J 50/12* (2016.02); *H02M 1/14* (2013.01); *H02M 3/335* (2013.01); *B60L 2200/26* (2013.01); *B60L 2200/40* (2013.01); *H02J 7/345* (2013.01); *Y02P 90/60* (2015.11); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | | |
|---|---|---|---|---|
| 2008/0316776 | A1* | 12/2008 | Nakanishi | ........... H02M 3/3353 363/21.02 |
| 2010/0201204 | A1 | 8/2010 | Sakoda et al. | |
| 2012/0112535 | A1* | 5/2012 | Karalis | .................... H03H 7/40 307/10.1 |
| 2013/0313913 | A1* | 11/2013 | Ichikawa | .............. B60L 11/182 307/104 |
| 2014/0373747 | A1* | 12/2014 | Yagci | ...................... B60L 8/003 104/290 |

FOREIGN PATENT DOCUMENTS

| | | |
|---|---|---|
| JP | 2010-183814 A | 8/2010 |
| JP | 2014-202489 A | 10/2014 |
| JP | 2015-156743 A | 8/2015 |
| WO | 2013/116651 A1 | 8/2013 |
| WO | WO-2013116651 A1 * | 8/2013 .............. B60L 8/003 |

OTHER PUBLICATIONS

Wireless Charging of a Supercapacitor Model Vehicle Using Magnetic Resonance Coupling, Fu et al., Univ of Michigan-Shanghai, ASME DETC2013-12530, IDETC/CIE Conference Proceedings, Aug. 4-7, 2013, Portland, Oregon (Year: 2013).*
Bellur et al., DC-DC Converter for Electric Vehicle Applications, Jul. 15, 2008, IEEE Xplore (Year: 2008).*
Illinois Capacitor Inc., Aluminum Electrolytic Capacitor Life Expectancy, Mar. 30, 2014, Illinoiscapacitor.com, p. 1 (Year: 2014).*
Anonymous. "Battery Charging for Automated Guided Vehicles (AGVs)", Mar. 27, 2016, retrieved from URL: www.vahleinc.com/battery-charging-contacts.html on Jun. 6, 2017.
Search Report issued in corresponding European Patent application No. 17169060.5, Aug. 8, 2017 (9 pages).
Wikipedia: "Capacitor—Wikipedia", Apr. 9, 2016, Retrieved from the Internet: URL: https://en.wikipedia.org/w/index.phptitle=Capacitor&oldid=714388875 (retrieved Jun. 4, 2018).
Office Action issued in the corresponding European Patent application, dated Jun. 18, 2018 (5 pages).
Office Action received in the corresponding Japanese Patent application, dated Aug. 27, 2019, and corresponding English translation (8 pages).

* cited by examiner

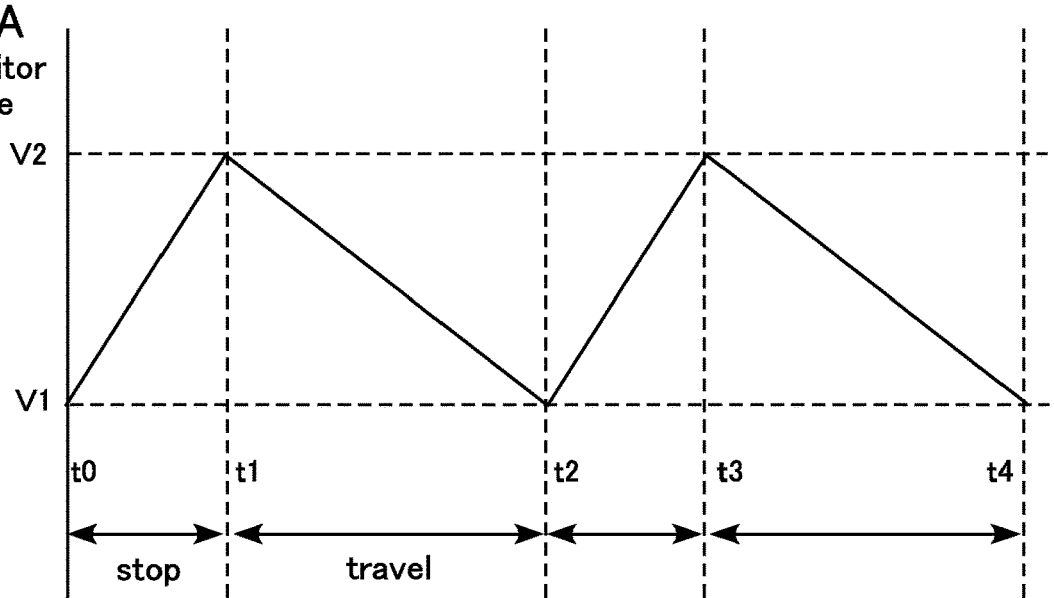
FIG.5A capacitor voltage
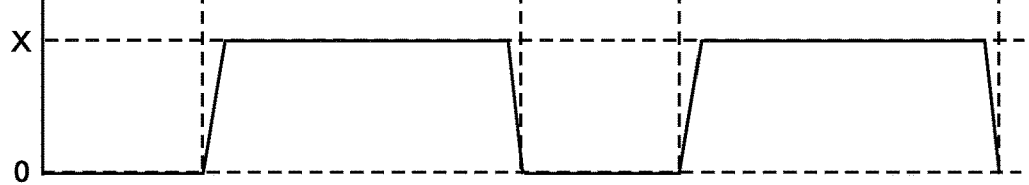
FIG.5B vehicle speed
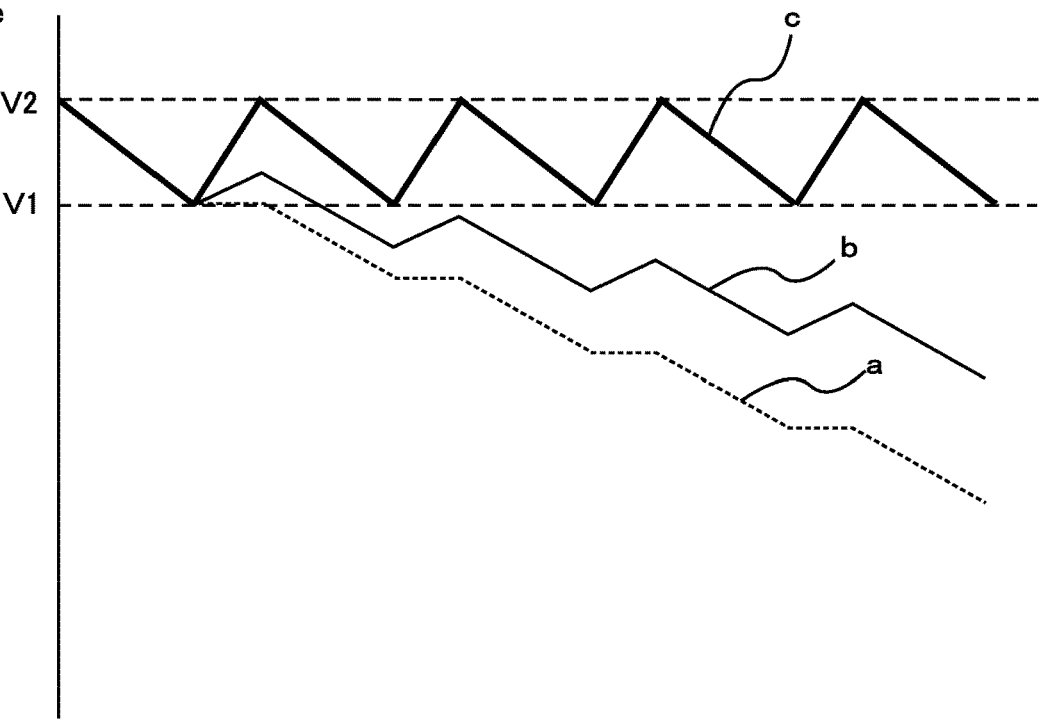
FIG.6 storage unit voltage

VEHICLE SYSTEM

FIELD

The present disclosure relates generally to a vehicle system. More specifically, the present disclosure relates to an AGV system for transporting objects by using an unmanned vehicle that travels automatically along a predetermined circulation route.

BACKGROUND

An AGV system is known in which an automated guided vehicle (AGV) is driven automatically along a predetermined circulation route in a factory or the like to transport objects. In such an AGV system, a decrease in the amount of energy in the battery of an AGV may be delayed by charging the battery with a charging device placed at a loading/unloading position while the AGV is stopped at the position to load or unload objects.

A technique has been developed in which power output by a power source is transmitted wirelessly to a load without the load and the power source being directly connected. This technique is commonly called contactless power transmission (or wireless power transmission) or wireless power supply. AGVs may be charged by using this technique. Charging by wireless power transmission eliminates the need for connecting or disconnecting a charging device and a battery with a connection cable, which leads to an enhanced working efficiency.

However, when the time for loading or unloading objects is short, the battery may not be fully charged. Thus, the battery may be repeatedly subjected to charging, which is performed for a short time while the AGV is stopped at a loading/unloading position, and discharging, which occurs while the AGV is traveling toward the next loading/unloading position. In this case, although a decrease in the battery voltage is suppressed as compared with a case where no charging is performed at the loading and unloading position, the battery voltage still decreases gradually. Thus, the battery may need to be replaced with another one or additionally charged outside the circulation route, which requires the transporting operation to be suspended and the AGV to be removed from the circulation route. In this way, there may be a limitation on the time for continuously using the AGV, and the AGV cannot be used for many consecutive days.

SUMMARY

A vehicle system provided according to one aspect of the present disclosure includes a power transmitter and a vehicle. The power transmitter is placed at one of at least one charge position. The vehicle includes: a power receiver, a capacitor, and a motor. The power receiver wirelessly receives first electric power from the power transmitter, and outputs second electric power deriving from the first electric power. The capacitor stores the second electric power output by the power receiver such that the capacitor is charged from a first voltage Vc1 to a second voltage Vc2. The motor is driven by the second electric power from the capacitor. The vehicle automatically travels a distance Dx along a route from one to a next one of the at least one charge position on the route. The distance Dx satisfies a relationship:

$$Dx \leq X \cdot \alpha \cdot Cc \cdot (Vc2^2 - Vc1^2)/(2 \cdot Id \cdot Vd),$$

where Cc is a capacitance of the capacitor, $\alpha$ is a coefficient not greater than 1, X is a speed of the vehicle, Vd is a drive voltage that drives the motor, and Id is a drive current that drives the motor.

DRAWINGS

Figure 1B:
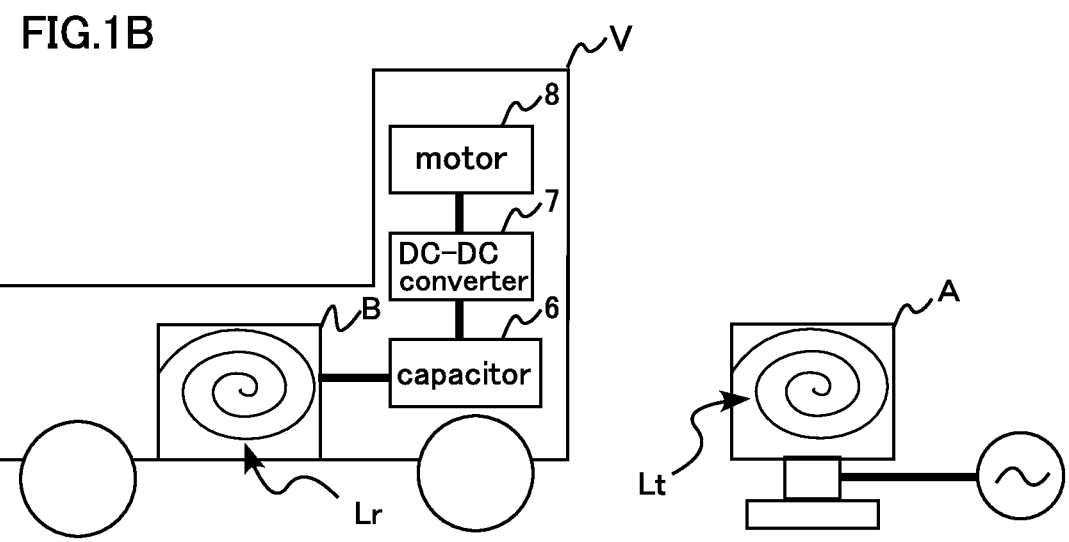
Figure 2:
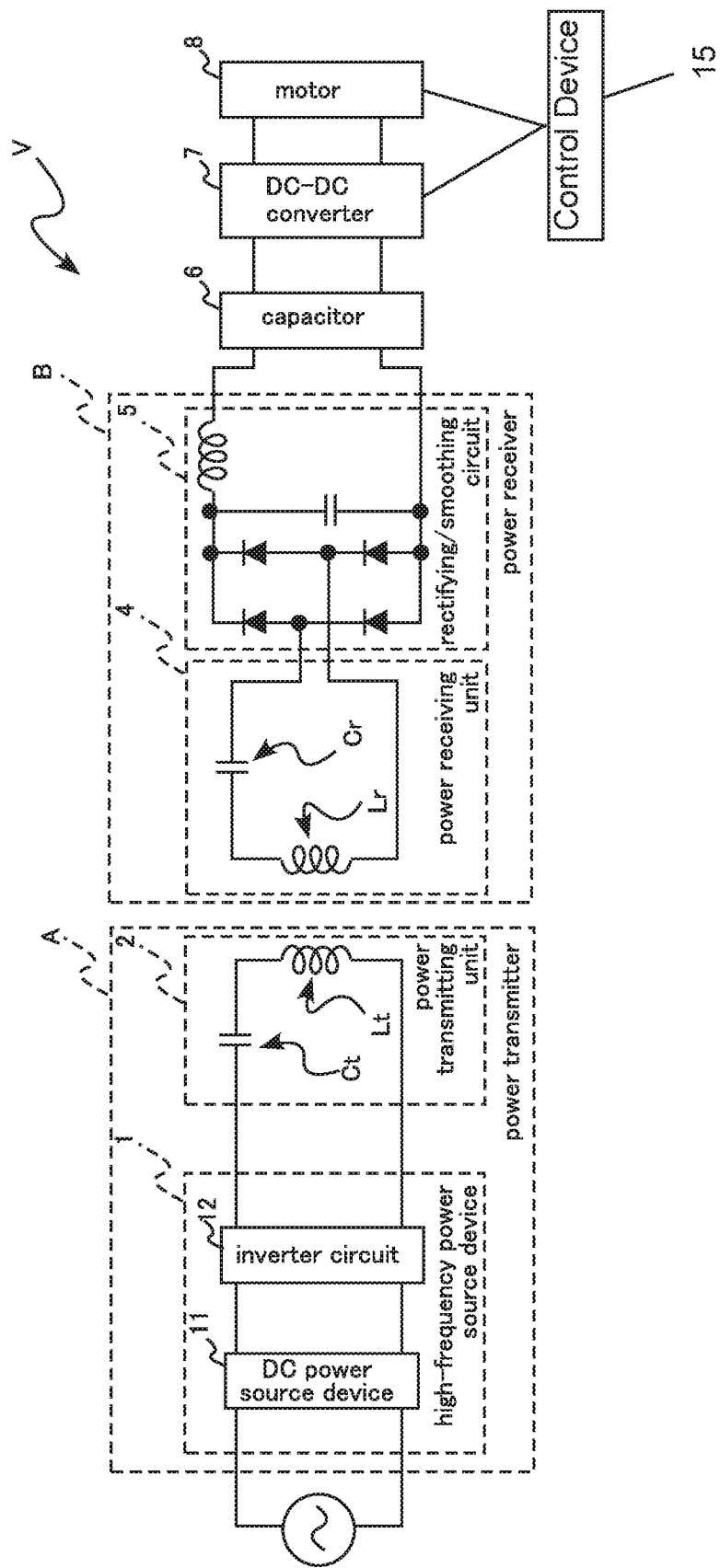
Figure 3A:
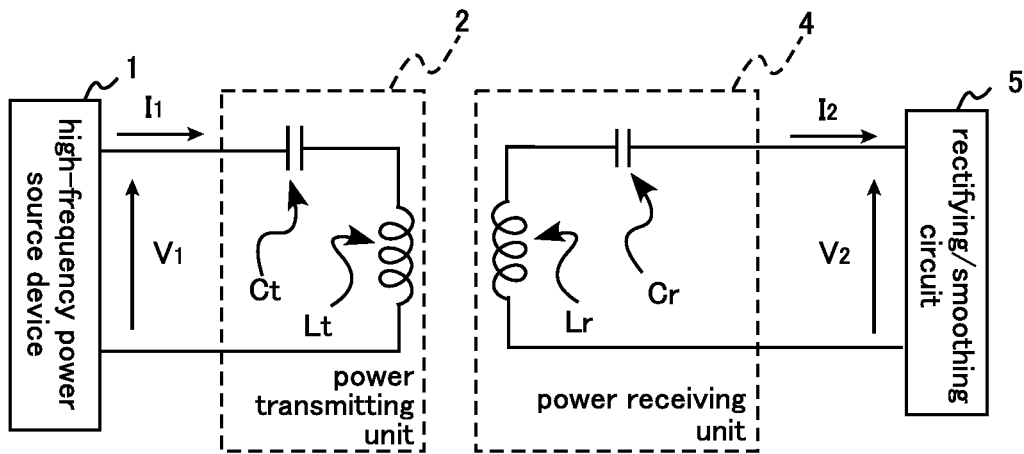
Figure 3B:
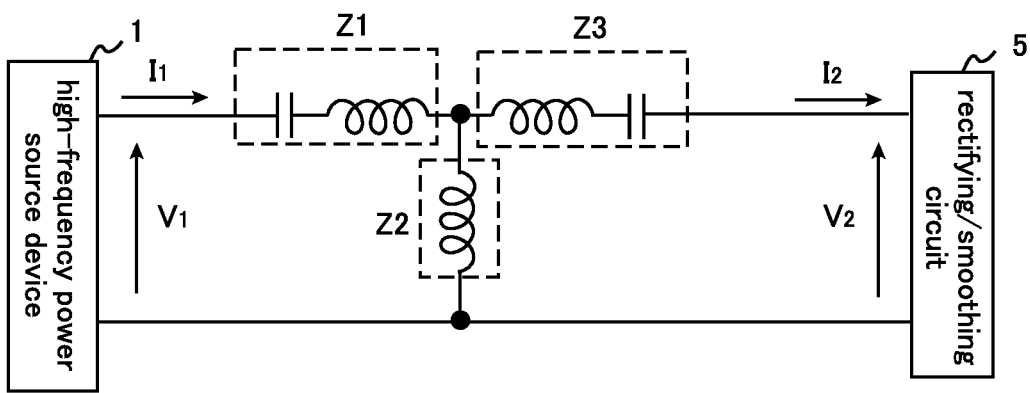
Figure 3C:
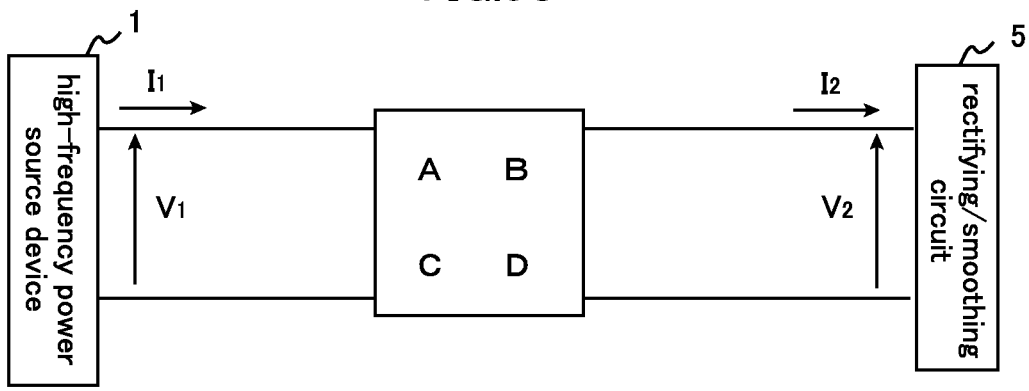
Figure 4A:
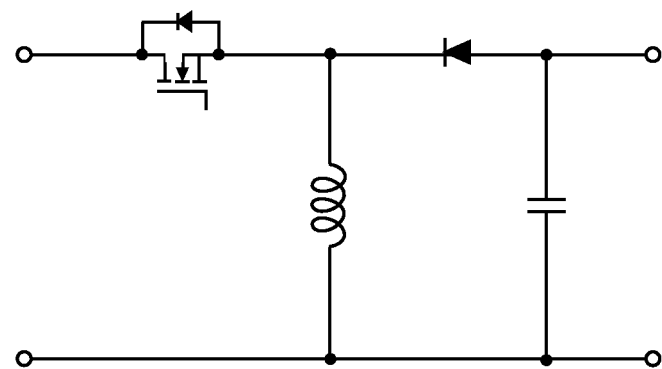
Figure 4B:
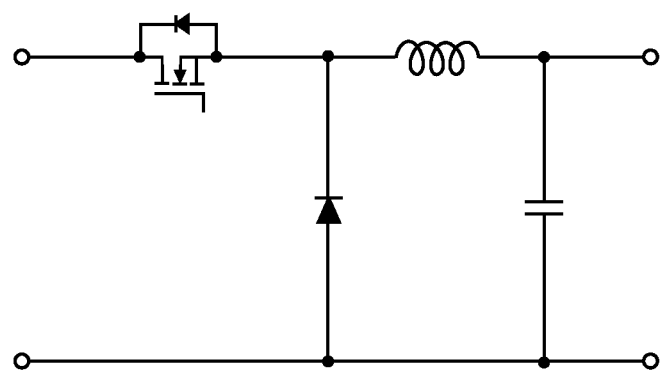
Figure 7:
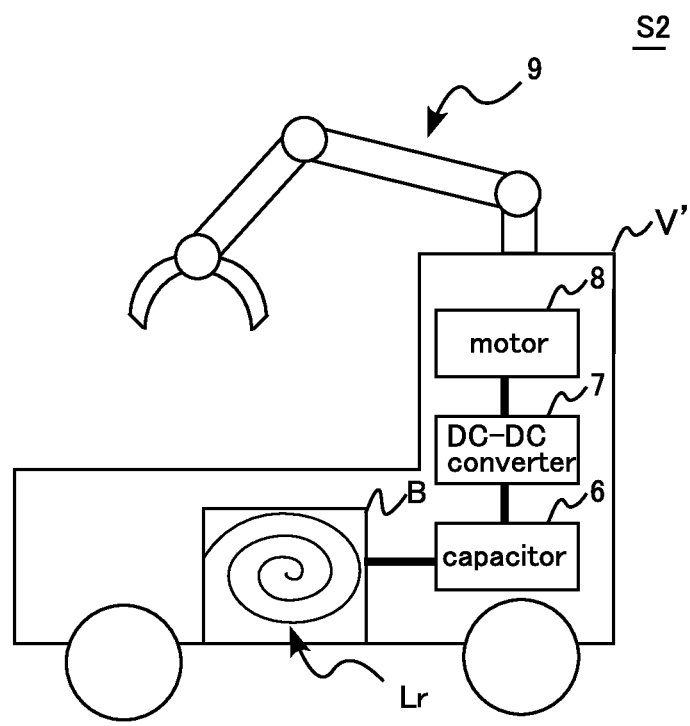
Figure 8A:
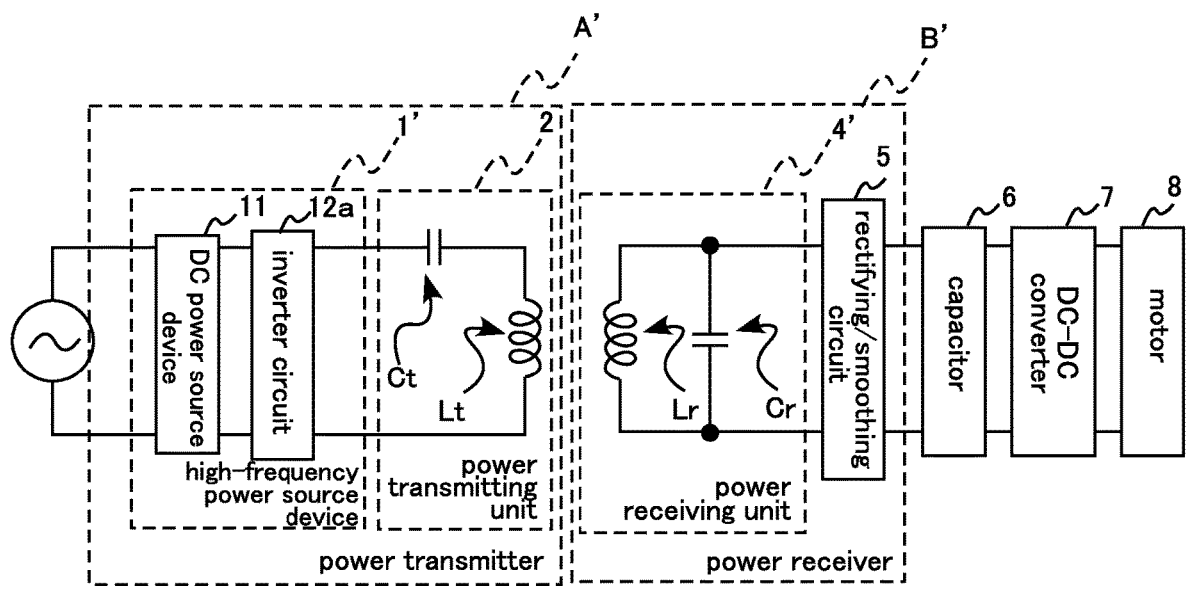
Figure 8B:
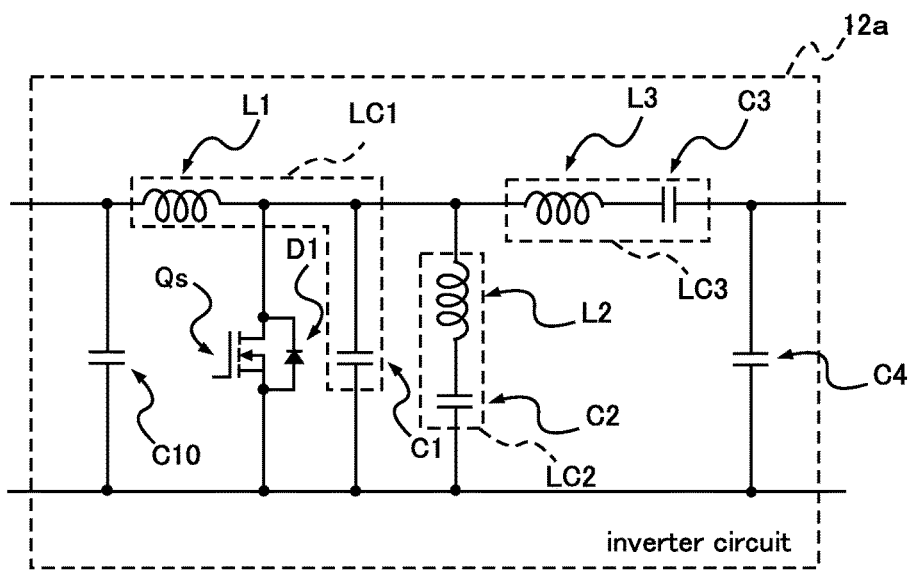
Figure 9A:
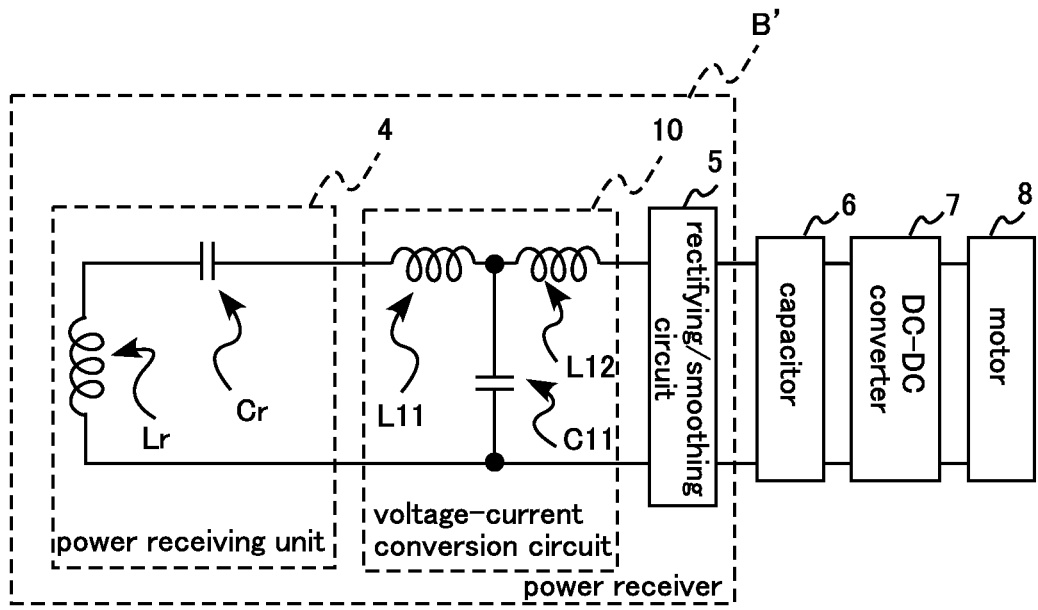
Figure 9B:
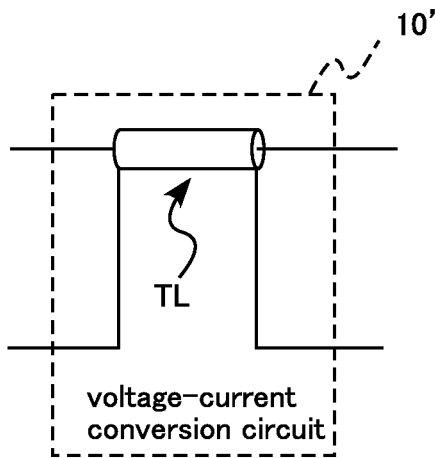
Figure 10A:
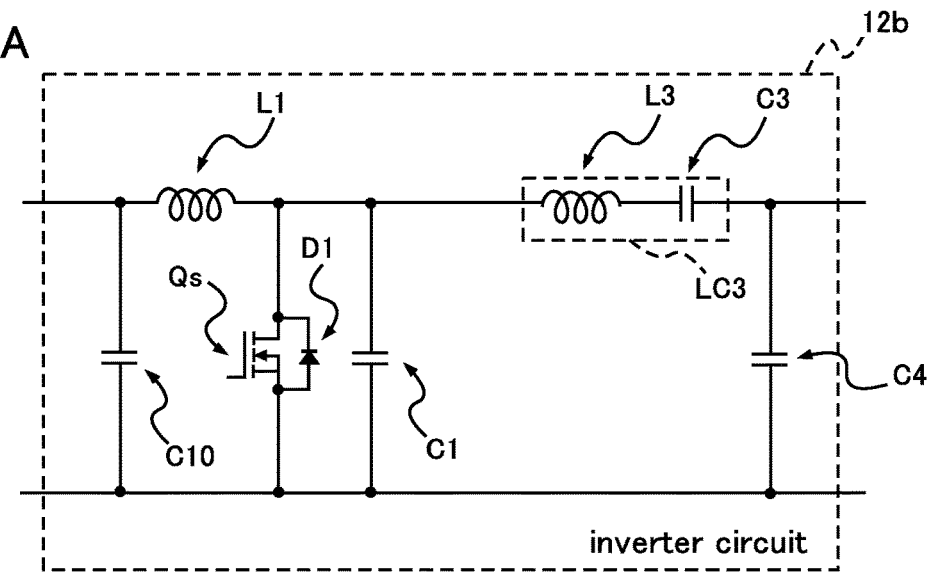
Figure 10B:
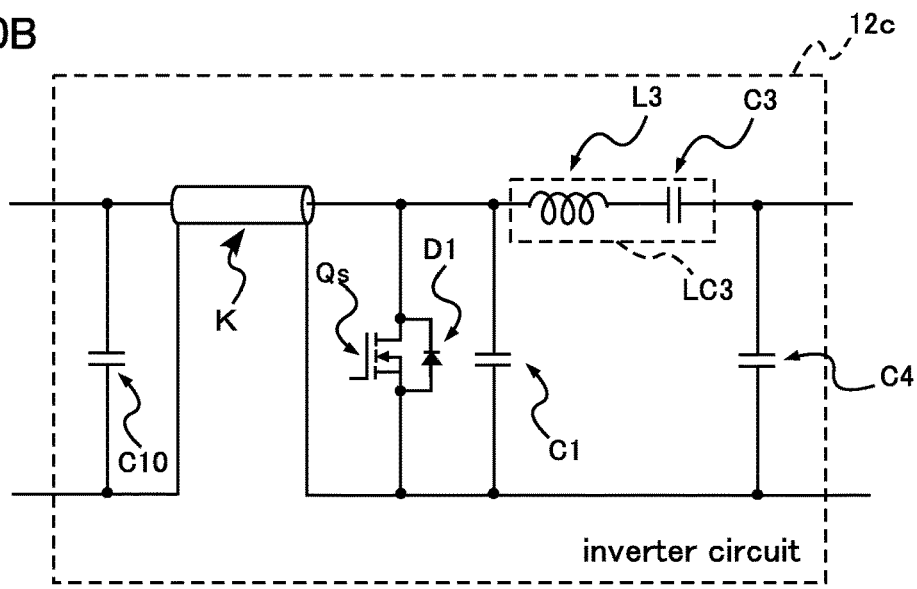
Figure 10C:
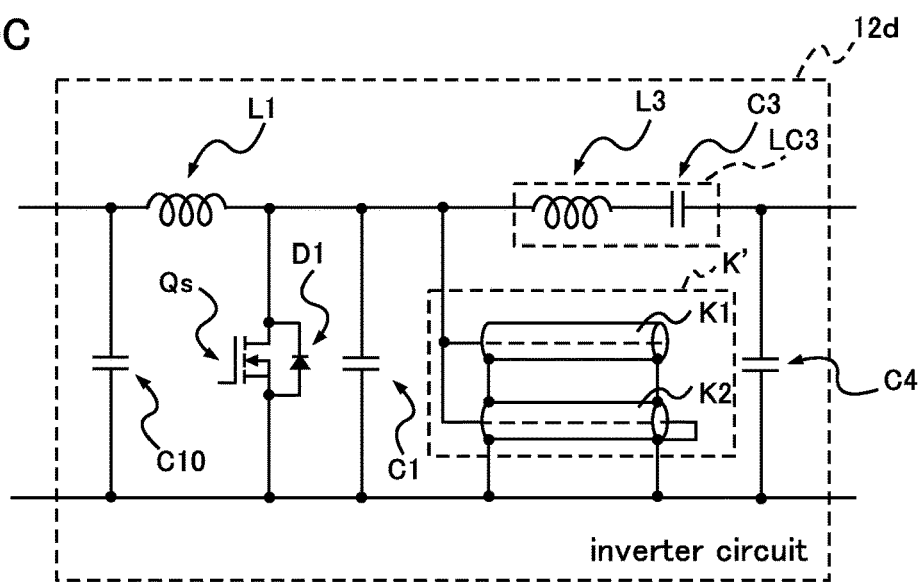
Figure 11:
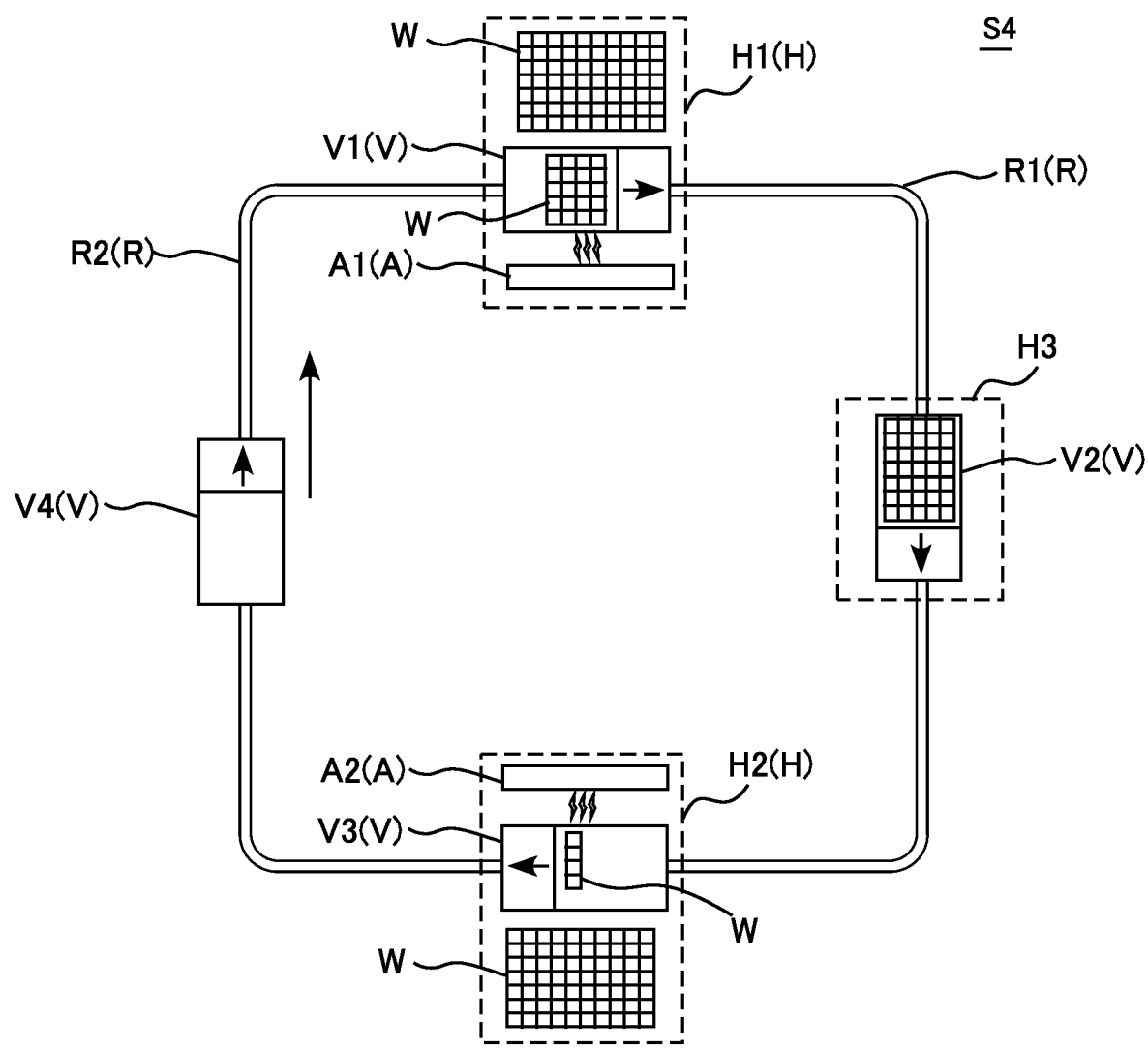
Figure 12:
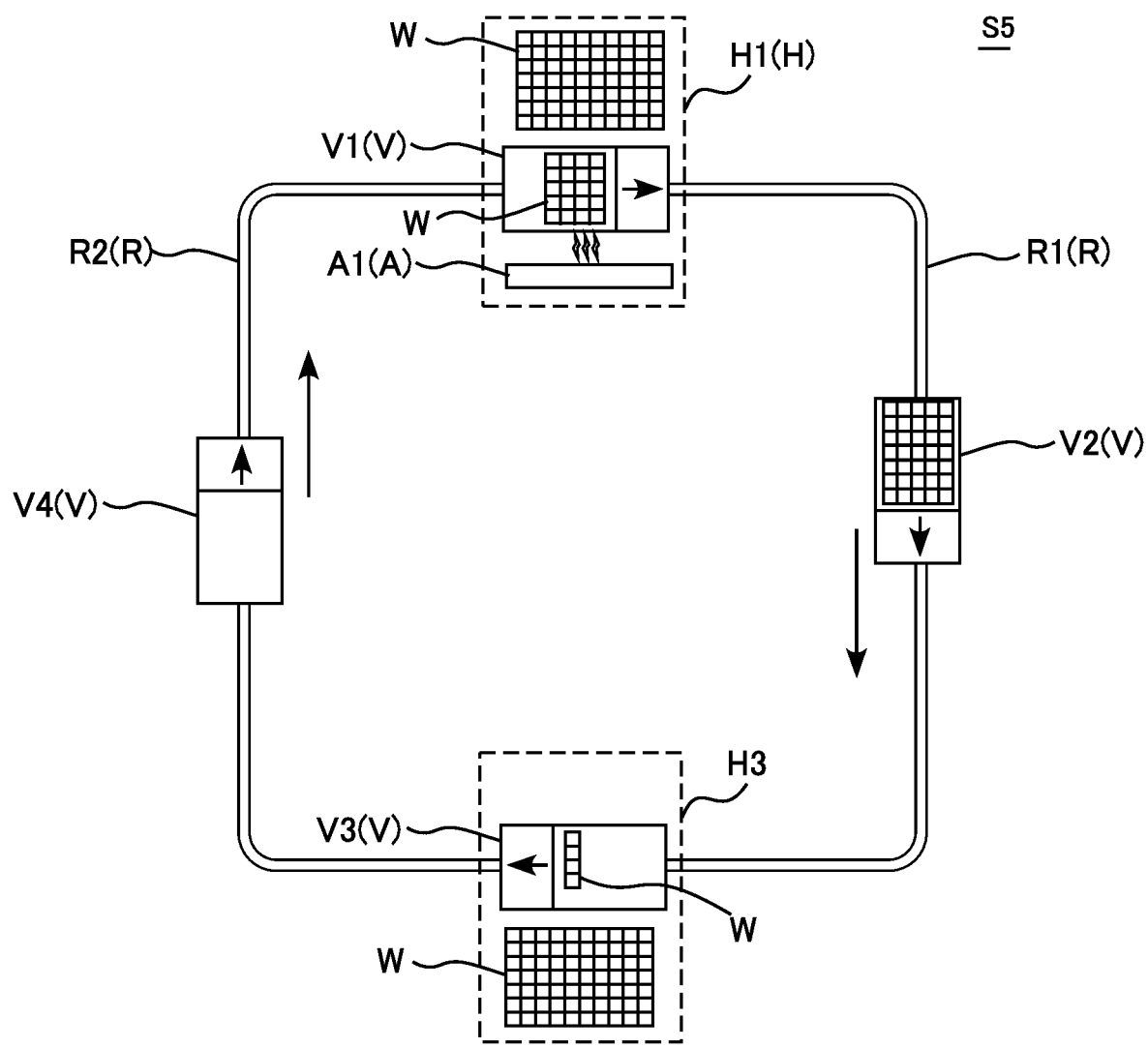

FIG. 1A is a schematic plan view showing the overall structure of an AGV system according to a first embodiment;
FIG. 1B is a schematic view showing the structure of an AGV and a power transmitter;
FIG. 2 is a drawing for describing the details of a power transmitter and a power receiver according to the first embodiment;
FIG. 3A is a diagram for describing the circuits of the power transmitter and the power receiver according to the first embodiment by using an equivalent circuit;
FIG. 3B is a diagram for describing the circuits of the power transmitter and the power receiver according to the first embodiment by using an equivalent circuit;
FIG. 3C is a diagram for describing the circuits of the power transmitter and the power receiver according to the first embodiment by using an equivalent circuit;
FIG. 4A is a circuit diagram showing an example of a DC-DC converter circuit;
FIG. 4B is a circuit diagram showing an example of a step-down DC-DC converter circuit;
FIG. 5A illustrates the change in voltage of the capacitor with time;
FIG. 5B illustrates the change in speed of the AGV with time;
FIG. 6 illustrates the change in voltage of a storage unit with time;
FIG. 7 is a drawing for describing an AGV system according to a second embodiment;
FIG. 8A is a drawing for describing an AGV system according to a third embodiment;
FIG. 8B is a drawing for describing an AGV system according to a third embodiment;
FIG. 9A illustrates a variation of the power receiver according to the third embodiment;
FIG. 9B illustrates a variation of a voltage-current conversion circuit according to a third embodiment;
FIG. 10A illustrates a variation of an inverter circuit according to the third embodiment;
FIG. 10B illustrates a variation of the inverter circuit according to the third embodiment;
FIG. 10C illustrates a variation of the inverter circuit according to the third embodiment;
FIG. 11 is a drawing for describing an AGV system according to a fourth embodiment; and
FIG. 12 is a drawing for describing an AGV system according to a fifth embodiment.

DETAILED DESCRIPTION

Embodiments of the present disclosure are described below with reference to the drawings.

FIGS. 1A and 1B are drawings for describing an AGV system S1 according to a first embodiment. FIG. 1A is a schematic plan view showing the overall structure of the AGV system S1. FIG. 1B is a schematic view showing the structure of an AGV and a power transmitter. FIG. 2 is a drawing for describing the details of the power transmitter and a power receiver.

As shown in FIG. 1A, the AGV system S1 includes a power transmitter A, AGVs V and a circulation route R. The AGVs V travel automatically along the predetermined circulation route R and stop at a plurality of predetermined stop positions H on the circulation route R. For example, an object W is loaded at the stop position H1, and the object W is unloaded at the stop position H2. Loading and unloading of an object W may be performed manually by an operator or may be performed by using a conveyor or a robot. An object W may be loaded at the stop position H2 and the object W may be unloaded at the stop position H1. While the present embodiment describes the case where two stop positions H are provided, the number of stop positions H is not limited. At some stop positions H, some kind of processing may be performed without loading or unloading an object W. Alternatively, at some stop positions H, the vehicles may be stopped just for standby. Each of the distances from the stop position H1 to the stop position H2 and from the stop position H2 to the stop position H1 along the circulation route R, which is the travel distance of the AGVs V between the stop positions H, is set to satisfy a predetermined conditional expression. Calculation of the conditional expression will be described later.

The stopping time T for which the AGVs V are stopped at stop positions H is set in advance. Loading and unloading of an object W is performed in the stopping time T. In the present embodiment, the stopping time T is 20 seconds. However, the stopping time T may be set appropriately.

In the AGV system S1, four AGVs V travel along the circulation route R clockwise as viewed in plan. In FIG. 1A, the AGV V1 is stopped at the stop position H1 and being loaded with an object W. The AGV V2 is traveling between the stop position H1 and the stop position H2 along the route R1 to transport an object W to the stop position H2. The AGV V3 is stopped at the stop position H2 and an object W is being unloaded from the vehicle. The AGV V4 is traveling between the stop position H2 and the stop position H1 along the route R2. While the present embodiment describes the use of four AGVs V, the number of AGVs V is not limited to four.

The technique with which the automatic guided vehicles V detect the circulation route R and the stop positions H is not limited. For example, a magnetic tape or a reflection tape may be attached to the floor surface along the circulation route R such that the automatic guided vehicles V detect such a tape with a magnetic sensor or an optical sensor. The AGVs may be configured to detect their own positions while traveling and stopping. Alternatively, the AGV V may be configured to travel on a rail disposed along the circulation route R. Driving of wheels may be controlled by a program such that the AGVs V stop at the stop positions H. Any method in which the AGVs V travel along the circulation route R and stop at the stop positions H may be used.

As shown in FIG. 1A, a power transmitter A is placed at each of the stop positions H. Each of the stop positions H corresponds to a "charge position" according to the present disclosure. That is, in the present embodiment, every "stop position" is a "charge position". As shown in FIG. 1B, each of the AGVs V has a power receiver B. Each power receiver B has a power-receiving coil Lr, which is a planar coil wound in a spiral shape. The power-receiving coil Lr is disposed on a side surface of the body of the AGV V (the right side surface in FIG. 1A) such that the coil surface is substantially perpendicular to the floor surface. Each power transmitter A has a power-transmitting coil Lt, which is a planar coil wound in a spiral shape. The power-transmitting coil Lt is arranged such that the coil surface is substantially perpendicular to the floor surface. The power transmitter A is arranged and oriented at a predetermined spot in the stop position H such that the power-transmitting coil Lt and the power-receiving coil Lr face each other with a slight distance between them when an AGV V is stopped at a stop position H. In the example shown in FIG. 1A, since the power-receiving coil Lr is disposed on the right side surface of each AGV V and the AGV V travels clockwise, each power transmitter A is disposed on the inner side of the circulation route R such that the power-transmitting coil Lt is substantially parallel to the circulation route R. When each AGV V travels counterclockwise or the power-receiving coil Lr is disposed on the left side surface of the AGV V, each power transmitter A is disposed on the outer side of the circulation route R. As shown in FIG. 1B, the power transmission coil Lt and the power reception coil Lr are placed at the same height. The power-transmitting coil Lt and the power-receiving coil Lr are not limited in terms of the shape and the number of turns.

Alternatively, the power-receiving coil Lr may be disposed on the bottom surface of the body of each AGV V such that the coil surface is substantially parallel to the floor surface, and each power-transmitting coil Lt may be disposed on the floor surface such that the coil surface is substantially parallel to the floor surface. In this case, since the distance between the floor surface and the bottom surface of the body of the AGV V is constant, the distance between the coil surface of the power-receiving coil Lr and that of the power-transmitting coil Lt is constant when the AGV H is stopped at the stop position H. In this case, it may be preferable to prevent the mechanism of the AGV V for detecting the circulation route R or stop positions H from interfering with power transmission/reception between the power-transmitting coil Lt and the power-receiving coil Lr.

While an automatic guided vehicle V is stopped at a stop position H, the power transmitter A placed at the stop position H wirelessly transmits power to the power receiver B of the automatic guided vehicle V. In the state shown in FIG. 1A, the power receiver B of the AGV V1 stopped at the stop position H1 is receiving power from the power transmitter A1, and the power receiver B of the AGV V3 stopped at the stop position H2 is receiving power from the power transmitter A2. Electric power (e.g., second electric power) deriving from the electric power (e.g., first electric power) that is received by the power receiver B is stored in a capacitor 6 provided in the automatic guided vehicle V. The automatic guided vehicle V uses the electric power stored in the capacitor 6 to drive a motor 8 and thereby travels by rotating wheels.

FIG. 2 shows the state in which the AGV V is stopped at a stop position H and the power-transmitting coil Lt of the power transmitter A and the power-receiving coil Lr of the power receiver B face each other with a slight distance between them. As shown in FIG. 2, the power transmitter A includes a high-frequency power source device 1 and a power transmitting unit 2. The power receiver B includes a power receiving unit 4 and a rectifying/smoothing circuit 5.

The high-frequency power source device 1 supplies high-frequency power to the power transmitting unit 2. The high-frequency power source device 1 outputs a high-frequency voltage of a constant magnitude and is a constant voltage source. The high-frequency power source device 1 includes a DC power source device 11 and an inverter circuit 12.

The DC power source device 11 generates and outputs DC power. The DC power source device 11 includes a rectifying circuit, a smoothing capacitor, and a DC-DC converter circuit. The DC power source device 11 uses a rectifying circuit to rectify an AC voltage (e.g. commercial voltage of 200 V) input from a commercial power supply and uses a smoothing circuit to smooth the resulting voltage, thereby performing conversion into a DC voltage. The DC-DC converter circuit converts the DC voltage into a DC voltage of a predetermined level (target voltage) and outputs the resulting DC voltage to the inverter circuit 12. The structure of the DC power source device 11 is not limited, and the DC power source device 11 only needs to output a DC voltage of a predetermined level.

The inverter circuit 12 converts a DC power into a high-frequency power. Specifically, the inverter circuit 12 converts the DC voltage input from the DC power source device 11 into a high-frequency voltage and outputs the voltage to the power transmitting unit 2. For example, the inverter circuit 12 is a single-phase full bridge inverter circuit having four switching elements. In the present embodiment, MOSFETs (Metal Oxide Semiconductor Field Effect Transistor) are used as the switching elements. Note that the switching element is not limited to a MOSFET and may be a bipolar transistor or an IGBT (Insulated Gate Bipolar Transistor), for example.

The inverter circuit 12 receives a high-frequency control signal from a control circuit (not shown) and switches each of the switching elements between the on state and the off state in response to the high-frequency control signal, to thereby convert DC power to high-frequency power. The high-frequency control signal is a pulse signal (which may be a sine wave signal) that repeats a high level and a low level at a predetermined frequency $f_0$ (e.g., 85 kHz). Since the frequency $f_0$ is the frequency at which the switching element is switched, it may be referred to as "switching frequency $f_0$" in the description below. The switching element enters the off state when the high-frequency control signal is at the low level, and enters the on state when the high-frequency control signal is at the high level.

A voltage sensor (not shown) for detecting the output voltage is provided at the output end of the inverter circuit 12A. The control circuit performs feedback control such that the output voltage detected by the voltage sensor matches a predetermined target voltage. Specifically, the control circuit generates a control pulse signal for setting the deviation between the output voltage detected by the voltage sensor and the predetermined target voltage to zero. The control pulse signal is amplified by a drive circuit (not shown) and output to the inverter circuit 12 as a high-frequency control signal. Thus, the output voltage of the inverter circuit 12 is controlled to the predetermined target voltage. The structures of the inverter circuit 12 and the control circuit are not limited to those described above, and they may only need to control the output voltage to a predetermined target voltage.

The structure of the high-frequency power source device 1 is not limited to the above-de scribed one. The high-frequency power source device 1 may have any structure that outputs a predetermined high-frequency voltage. In the present embodiment, since the switching frequency $f_0$ of the high-frequency power source device 1 is 85 kHz, the frequency of the high-frequency power output by the power transmitting unit 2 (output frequency) is also 85 kHz. The output frequency (switching frequency $f_0$) is not limited to 85 kHz, and any frequency not less than 50 kHz may be used. Since the high-frequency power source device 1 outputs a large current, the high frequency current output from the power transmitting unit 2 is also a large current. The output current of the high-frequency power source device 1 is not limited, and it may be only necessary that the output current allows the capacitor 6, which will be described later, to be charged with a current of not less than 50 A.

The power transmitting unit 2 includes a power-transmitting coil Lt and a resonance capacitor Ct. The power-transmitting coil Lt transmits the high-frequency power supplied by the high-frequency power source device 1 to the power receiver B. The power-transmitting coil Lt is not limited in terms of the shape and the number of turns. The resonance capacitor Ct is connected in series to the power-transmitting coil Lt and constitutes a serial resonance circuit.

The power-transmitting coil Lt and the resonance capacitor Ct are designed such that the resonant frequency matches the frequency $f_0$ (switching frequency $f_0$) of the high-frequency power supplied from the high-frequency power source device 1. That is, they are designed such that the self-inductance $L_t$ of the power-transmitting coil Lt and the capacitance $C_t$ of the resonance capacitor Ct are in the relationship represented by the formula (1) below. Note that if the switching frequency $f_0$ is high, the floating capacitance between the windings of the power-transmitting coil Lt may be used as the resonance capacitor Ct.

$$2\pi f_0 L_t = \frac{1}{2\pi f_0 C_t} \tag{1}$$

Although not shown, the power transmitter A includes a control device for controlling activation and deactivation of the high-frequency power source device 1. The control device activates the high-frequency power source device 1 upon detecting that the AGV V has stopped at the stop position H. The technique for detecting the stop of the AGV V at a stop position H is not limited. For example, such a stop may be detected by a sensor or based on communication with the AGV V. Further, the control device deactivates the high-frequency power source device 1 when the stopping time T has elapsed from the activation of the high-frequency power source device 1. The control device may deactivate the high-frequency power source device 1 upon detecting that the AGV V has departed from the stop position H (or the AGV V is not at the stop position H). The control device deactivates the high-frequency power source device 1 also when the capacitor 6 of the AGV V is fully charged. The method for detecting the full charge of the capacitor 6 is not limited. For example, the full charge may be detected based on the electrical information (e.g., the output current, output power or reflected power of the high-frequency power supply device 1) detected inside the power transmitter A or based on the communication with the AGV V.

The power receiving unit 4 includes a power-receiving coil Lr and a resonance capacitor Cr. The power-receiving coil Lr is magnetically coupled to the power-transmitting coil Lt to wirelessly receive power. The resonance capacitor Cr is connected in series to the power-receiving coil Lr and constitutes a serial resonance circuit.

Similarly to the power-transmitting coil Lt and the resonance capacitor Ct, the power-receiving coil Lr and the resonance capacitor Cr are designed such that the resonant frequency matches the frequency $f_0$ (switching frequency $f_0$) of the high-frequency power supplied from the high-frequency power source device 1. Note that if the switching frequency $f_0$ is high, the floating capacitance between the windings of the power-receiving coil Lr may be used as the resonance capacitor Cr.

The power-receiving coil Lr and the power-transmitting coil Lt are magnetically coupled so that the power receiver B receives high-frequency power from the power transmitter A. That is, due to the high-frequency current flowing in the power transmission coils Lt, magnetic flux changes, and the high-frequency current flow in the power reception coils Lr that the magnetic flux crosses. In this way, power is supplied wirelessly from the power transmitter A to the power receiver B. FIG. 2 shows a state in which the power-receiving coil Lr and the power-transmitting coil Lt are magnetically coupled to each other.

The power transmitting unit 2 and the power receiving unit 4 are both resonance circuits and resonantly coupled to each other. That is, power transmission of electric power from the power transmitting unit 2 to the power receiving unit 4 is performed wirelessly by magnetic field resonance. The power received by the power receiving unit 4 is output to the rectifying/smoothing circuit 5.

The rectifying/smoothing circuit 5 rectifies the high-frequency current output by the power receiving unit 4 to convert it into a DC current. The rectifying/smoothing circuit 5 includes a full-wave rectifying circuit obtained by bridge-connecting four diodes. The rectifying/smoothing circuit 5 also includes a smoothing circuit for smoothing the rectified output. There is no limitation on the configuration of the rectifying/smoothing circuit 5, and it is sufficient that the rectifying/smoothing circuit 5 converts the high-frequency current into a DC current. The DC current output from the rectifying/smoothing circuit 5 is supplied to the capacitor 6.

The current supplied to the capacitor 6 is constant regardless of the state of charge of the capacitor 6. This is explained below with reference to FIGS. 3A-3C.

FIG. 3A shows the power transmitter A and the power receiver B as extracted from FIG. 2.

Let $V_1$ be the output voltage and $I_1$ be the output current of the high-frequency power source device 1. Also, Let $V_2$ be the voltage applied to the rectifying/smoothing circuit 5, and $I_2$ be the current that is input to the rectifying/smoothing circuit 5. Note that the voltages $V_1$ and $V_2$ and the currents and $I_2$ are all vectors.

In general, an equivalent circuit of a wireless power transmission system can be expressed by replacing the magnetically coupled power-transmitting coil and power-receiving coil with a T circuit constituted by three coils. Converting the circuit shown in FIG. 3A into an equivalent circuit represented by using a T circuit gives the circuit in FIG. 3A. In FIG. 3B, the impedances of the capacitors or coils are expressed as Z1 to Z3. Note that the impedances Z1 to Z3 are all vectors. The inductance of the coil on the power transmitting unit side (the coil included in the impedance Z1) among the coils in the T circuit is obtained by subtracting the mutual inductance caused by magnetic coupling between the power-transmitting coil Lt and the power-receiving coil Lr from the self-inductance of the power-transmitting coil Lt. The inductance of the coil on the power receiving unit side (the coil included in the impedance Z3) among the coils in the T circuit is obtained by subtracting the mutual inductance caused by magnetic coupling between the power-transmitting coil Lt and the power-receiving coil Lr from the self-inductance of the power-receiving coil Lr. The inductance of the coil connected in parallel (coil included in the impedance Z2) among the coils in the T circuit is the mutual inductance caused by magnetic coupling between the power-transmitting coil Lt and the power-receiving coil Lr. Accordingly, the impedances Z1 to Z3 can be expressed using formulae (2) to (4) below. In these formulae, the inductances of the power-transmitting coil Lt and the power-receiving coil Lr are denoted as $L_t$ and $L_r$, respectively, and the capacitances of the resonance capacitor Ct and the resonance capacitor Cr are denoted as $C_t$ and $C_r$, respectively. The coupling coefficient for the power-transmitting coil Lt and the power-receiving coil Lr is denoted as k.

$$Z1 = \frac{1}{j\omega \cdot C_t} + j\omega\left(L_t - k\sqrt{L_t \cdot L_r}\right) \quad (2)$$

$$Z2 = j\omega k\sqrt{L_t \cdot L_r} \quad (3)$$

$$Z3 = \frac{1}{j\omega \cdot C_r} + j\omega\left(L_r - k\sqrt{L_t \cdot L_r}\right) \quad (4)$$

FIG. 3C shows an equivalent circuit that represents the circuit in FIG. 3B using an F parameter. Note that the elements A, B, C, and D of the F parameter are all vectors, and the F parameter is as expressed by formula (5) below.

$$\begin{pmatrix} A & B \\ C & D \end{pmatrix} = \begin{pmatrix} 1 & Z1 \\ 0 & 1 \end{pmatrix}\begin{pmatrix} 1 & 0 \\ \frac{1}{Z2} & 1 \end{pmatrix}\begin{pmatrix} 1 & Z3 \\ 0 & 1 \end{pmatrix} \quad (5)$$

$$= \begin{pmatrix} \frac{Z1+Z2}{Z2} & \frac{(Z1+Z2)(Z2+Z3)-Z2^2}{Z2} \\ \frac{1}{Z2} & \frac{Z2+Z3}{Z2} \end{pmatrix}$$

Substituting Z1+Z2=Z2+Z3=0, which is a conditional expression for magnetic field resonance, into formula (5) gives formula (6) below. Accordingly, formula (8) below is obtained based on formula (7) below and formula (3) above.

$$\begin{pmatrix} A & B \\ C & D \end{pmatrix} = \begin{pmatrix} 0 & -Z2 \\ \frac{1}{Z2} & 0 \end{pmatrix} \quad (6)$$

$$\begin{pmatrix} V_1 \\ I_1 \end{pmatrix} = \begin{pmatrix} A & B \\ C & D \end{pmatrix}\begin{pmatrix} V_2 \\ I_2 \end{pmatrix} = \begin{pmatrix} 0 & -Z2 \\ \frac{1}{Z2} & 0 \end{pmatrix}\begin{pmatrix} V_2 \\ I_2 \end{pmatrix} \quad (7)$$

$$V_1 = -Z2 \times I_2$$

$$\therefore I_2 = -\frac{1}{Z2} \times V_1 = -\frac{1}{j\omega k\sqrt{L_t \cdot L_r}} \times V_1 \quad (8)$$

As long as the distance between the power-transmitting coil Lt and the power-receiving coil Lr does not change, the coupling coefficient k does not change. Accordingly, according to formula (8) above, the magnitude of the current $I_2$ output from the power receiving unit 4 is proportional to the magnitude of the voltage $V_1$ input to the power transmitting unit 2. The voltage $V_1$ input to the power transmitting unit 2 is the output voltage $V_1$ of the high-frequency power source device 1. The high-frequency power source device 1 keeps the magnitude of the output voltage $V_1$ constant. Thus, the magnitude of the output current $I_2$ of the power receiving unit 4 is constant, regardless of the impedance or the like of a load that is connected. That is, the output of the power receiving unit 4 can be considered as a constant current source that outputs the current $I_2$ of a constant magnitude. Since the magnitude of the output current $I_2$ of the power receiving unit 4 is constant, the current rectified and smoothed by the rectifying/smoothing circuit 5 is also constant. Thus, the current supplied to the capacitor 6 is constant regardless of the state of charge of the capacitor 6. That is, the capacitor 6 is charged with a constant current. Such constant current charge prevents excessive charging, failures of elements or increased loss due to overcurrent are avoided.

The capacitor 6 is provided for storing electric power and may be implemented by connecting capacitors, such as electric double-layer capacitors or lithium ion capacitors, in series and parallel to obtain a required capacitance. Alternatively, the capacitor 6 may be constituted of a single capacitor having a large capacitance. As compared to other power storage devices, capacitors are more suitable for use in a charging system that repeats charging and discharging cycles, because capacitors deteriorate less as a result of charging and discharging and thus have a longer service life, and are available for fast charging with large current. As described above, the power transmitting unit 2 outputs a large high-frequency current having a high frequency (85 kHz). The high-frequency current received by the power receiving unit 4 is rectified by the rectifying/smoothing circuit 5 and output to the capacitor 6. Thus, the capacitor 6 is charged with a large constant DC current. In this embodiment, the capacitor 6 is charged with a current of 50 A. Thus, the capacitor 6 stores large electric energy in a short time. The charging current for the capacitor 6 is not limited and may be any value not less than 50 A. The capacitor 6 supplies electric power to the motor 8 via a DC-DC converter circuit 7.

The DC-DC converter circuit 7 transforms the voltage output from the capacitor 6 to a drive voltage (e.g., 24 V or 48 V) for driving the motor 8 and applies the drive voltage to the motor 8. The DC-DC converter circuit 7 supplies a predetermined drive voltage to the motor 8, although the voltage of the capacitor 6 varies depending on the charged amount. In the present embodiment, a step-up/down DC-DC converter circuit is used as the DC-DC converter circuit 7. FIG. 4A is a circuit diagram showing an example of step-up/down DC-DC converter circuit. The configuration of the step-up/down DC-DC converter circuit is not limited to this.

The motor 8 rotates the wheels of the AGV V. The AGV V includes a control device 15 (FIG. 2) for controlling the DC-DC converter circuit 7 or the motor 8. The control device stops the motor 8 when the AGV V has arrived at a stop position H and drives the motor 8 in driving the AGV V. The electric power for driving the motor 8 is supplied from the capacitor 6. When the AGV V travels, the electric energy stored in the capacitor 6 is consumed by driving the motor 8.

Calculation of the conditional expression for the distance between stop positions H along the circulation route R will be described below.

While an AGV V is stopped at a stop position H, the power transmitter A placed at the stop position H wirelessly transmits power to the power receiver B of the AGV V. In this period, the capacitor 6 is charged with a large constant DC current. If the capacitor 6 is charged from a first voltage Vc1 to a second voltage Vc2 (>Vc1), then the electric energy E1 charged in the capacitor 6 is:

$$E1=Cc \cdot (Vc2^2-Vc1^2)/2 \qquad (9)$$

where Cc is the capacitance of the capacitor 6.

If the automatic guided vehicle V travels a distance Dx at a travel speed of X, then the electric energy E2 consumed in traveling is:

$$E2=Id \cdot Vd \cdot (Dx/X) \qquad (10)$$

where Vd is a drive voltage and Id is a drive current for driving the motor 8.

If the electric energy E2 consumed in traveling does not exceed the electric energy E1 charged when the vehicle is stopped (E2≤E1), the amount of electricity stored in the capacitor 6 does not drop below a predetermined level. The following formula (11) is derived from the formulae (9) and (10), and when the distance Dx satisfies the condition represented by the formula (11), E2≤E1 holds.

$$Dx \leq X \cdot Cc \cdot (Vc2^2-Vc1^2)/(2 \cdot Id \cdot Vd). \qquad (11)$$

That is, if the travel distance Dx of the AGV V satisfies the above formula (11), the amount of electricity stored in the capacitor 6 does not drop below a predetermined level. In the circulation route R of the present embodiment, each of the distance of the route R1 from the stop position H1 to the stop position H2 and the distance of the route R2 from the stop position H2 to the stop position H1 is set to satisfy the above formula (11).

For example, in the case where the capacitance Cc of the capacitor 6 is 100 F and the capacitor is charged from the first voltage Vc1 of 20V to the second voltage Vc2 of 30V when the AGV V is stopped, Dx≤41.7 m provided that the drive voltage Vd is 24 V, the drive current Id is 15 A, and the travel speed X is 0.6 m/s. In this case, each of the distances of the routes R1 and R2 may be set to 40 m, for example. If it is desired to increase the distance of the route R1, another stop position H for standby may be added in the middle of the route R1 such that each distance between adjacent ones of the stop positions H satisfies the above formula (11).

The formula (11) does not take into consideration a decrease in the capacitance of the capacitor 6 due to deterioration. Since such a decrease in the capacitance is only about 10% in 10 years, it is usually negligible when the circulation route is properly designed to satisfy the formula (11). However, when the deterioration of the capacitor 6 is taken into consideration, the Dx may be set to satisfy:

$$Dx \leq X \cdot \alpha \cdot Cc \cdot (Vc2^2-Vc1^2)/(2 \cdot Id \cdot Vd). \qquad (12)$$

where α is a coefficient for taking the decrease of the capacitance Cc due to deterioration into consideration. The value of α may be set appropriately depending on the use period of the AGV system S1 and may be from 0.9 (decreased to 90%) to 0.7 (decreased to 70%), for example.

Each state of the AGV V when the AGV system S1 according to the first embodiment is in operation is described below with reference to FIGS. 1A, 1B, 5A and 5B. FIG. 5A illustrates the change in voltage of the capacitor 6 with time, and FIG. 5B illustrates the change in speed of the AGV V with time.

When an AGV V arrives at the stop position H1, an object W is loaded onto the AGV V (the state of the AGV V1 in FIG. 1). In this period, power is transmitted from the power transmitter A1 to the power receiver B of the AGV V to charge the capacitor 6. At this time, the voltage of the capacitor 6 increases from the first voltage Vc1 to the second voltage Vc2 as indicated in the period from t0 to t1 in FIGS. 5A and 5B. Since the AGV V is stopped, the vehicle speed is "0".

When loading is completed (the stopping time T has elapsed), the AGV V travels toward the stop position H2 along the route R1 (the state of the AGV V2 in FIG. 1A). At this time, power is consumed for driving the motor 8, and the capacitor 6 is discharged. At this time, the voltage of the capacitor 6 decreases from the second voltage Vc2 to the first voltage Vc1 as indicated in the period from t1 to t2 in FIGS. 5A and 5B. The vehicle speed becomes X due to acceleration and decelerates immediately before stopping to drop to "0". The acceleration/deceleration time is extremely short and hence negligible. An average speed may be used instead of the travel speed X.

When an AGV V arrives at the stop position H2, the object W is unloaded from the vehicle V (the state of the AGV V3 in FIG. 1A). In this period, power is transmitted from the power transmitter A2 to the power receiver B of the AGV V to charge the capacitor 6. At this time, the voltage of the capacitor 6 increases from the first voltage Vc1 to the second voltage Vc2 as indicated in the period from t2 to t3 in FIGS. 5A and 5B. Since the vehicle is stopped, the vehicle speed is "0".

When unloading is completed (the stopping time T has elapsed), the AGV V travels toward the stop position H1 along the route R2 (the state of the AGV V4 in FIG. 1A). At this time, power is consumed for driving the motor 8, and the capacitor 6 is discharged. At this time, the voltage of the capacitor 6 decreases from the second voltage Vc2 to the first voltage Vc1 as indicated in the period from t3 to t4 in FIGS. 5A and 5B. The vehicle speed becomes X due to acceleration and decelerates immediately before stopping to drop to "0".

Illustrated in FIG. 5A is the voltage change when the respective distances of the route R1 and the route R2 are equal to the right side of the formula (11) (i.e., when the equal sign in the formula (11) holds). Actually, however, the distances of the routes R1 and R2 are set shorter, such that the voltage of the capacitor 6 does not actually drop to the first voltage Vc1. Therefore, it may be considered that charging the capacitor 6 in the next stopping time T may cause the voltage of the capacitor 6 to exceed the second voltage vc2. In the present embodiment, however, the power transmitter A and the power receiver B are configured to stop power transmission and reception when the voltage of the capacitor 6 reaches a predetermined voltage, thereby preventing the voltage of the capacitor 6 from exceeding an allowable maximum voltage. The power transmission and reception may be stopped when the voltage of the capacitor 6 reaches the second voltage vc2. In any case, the voltage of the capacitor 6 does not drop below the first voltage Vc1.

According to the present embodiment, power is supplied wirelessly from the power transmitter placed at a stop position H to the power receiver B of the AGV V while the AGV V is stopped at the stop position H. The capacitor 6 is used as a power storage unit, and by performing wireless power supply with a large current having a high frequency, a large electric energy is charged in a short time. Also, each of the distance of the route R1 and the distance of the route R2 is set to satisfy the above formula (11). Thus, the electric energy consumed in traveling along the route R1 and the route R2 does not exceed the electric energy charged during the stop, so that the amount of electricity stored in the capacitor 6 does not drop below a predetermined level. This allows continuous use of the capacitor 6 and eliminates the need for suspending the transport operation and removing the vehicle V from the circulation route R for replacing or additionally charging the capacitor 6.

FIG. 6 illustrates the change in voltage of a storage unit with time. The dotted line a shows the change with time of the voltage when the storage unit is a battery and charging is not performed during a stopping time of the AGV. The thin line b shows the change with time of the voltage when the storage unit is a battery and charging is performed in a short stopping time of the AGV. The bold line c shows the change with time of the voltage of the capacitor 6 according to the present embodiment. In the case of the dotted line a, the voltage of the battery decreases as the AGV travels. Thus, before the voltage of the battery becomes too low, the battery may need to be replaced or charged by suspending the transport operation and removing the vehicle from the circulation route. In the case of the thin line b, charging the battery in a short stopping time suppresses the decrease of the battery voltage as compared with the case of the dotted line a. However, the battery voltage still drops gradually. Thus, the battery needs to be charged or replaced, though not so often as the case of the dotted line a. In the case of the present embodiment (see bold line c), rapid charging is performed in a short time, and the distances of the routes R1 and R2 are set properly such that the voltage of the capacitor 6 varies between the first voltage Vc1 and the second voltage Vc2 and does not drop below the first voltage Vc1. Thus, replacement or additional charging of the capacitor 6 is unnecessary.

In the present embodiment, each of the power transmitting unit 2 and the power receiving unit 4 is a serial resonance circuit. Further, the high-frequency power source device 1 outputs a high-frequency voltage of a constant magnitude to the power transmitting unit 2, and power transmission from the power transmitting unit 2 to the power receiving unit 4 is performed by magnetic field resonance. Thus, the output of the power receiving unit 4 is equivalent to the output of the constant current source. Thus, the current supplied to the capacitor 6 is constant regardless of the state of charge of the capacitor 6. That is, the capacitor 6 is charged with a constant current. Such constant current charge prevents excessive charging, failures of elements or increased loss due to overcurrent are avoided.

In the present embodiment, a step-up/down DC-DC converter circuit is used as the DC-DC converter circuit 7, because the first voltage vc1 is lower than the drive voltage Vd. When the first voltage Vc1 is set to be not less than the drive voltage Vd, a step-down DC-DC converter circuit may be used as the DC-DC converter circuit 7. FIG. 4B is a circuit diagram showing an example of step-down DC-DC converter circuit. The configuration of a step-down DC-DC converter circuit is not limited to this. A step-down DC-DC converter circuit is smaller, lighter in weight and less expensive than a step-up/down DC-DC converter circuit. Thus, use of a step-down DC-DC converter contributes to reduction in magnitude and weight of the AGV V and cuts the manufacturing cost.

If the first voltage Vc1 is 25 V, which is higher than the drive voltage Vd (24 V), in the calculation example given above, Dx≤22.9 m is obtained from the above formula (11). This indicates that each of the distances of the routes R1 and R2 may need to be set shorter than that in the case of the computation example given above. However, provided that charging is performed with the same magnitude of current for the same period of time, the second voltage Vc2 can be increased by the same amount as the first voltage Vc1, to become higher than the second voltage in the above computation example. That is, the second voltage Vc2 can be 35 V. Thus, from the formula (11), Dx≤50 m. That is, each of the distances of the routes R1 and R2 can be made longer than that in the above computation example. This can be understood also from the fact that the higher the first voltage Vc1 and the second voltage Vc2 are, the larger the electric energy E1 charged in the capacitor 6 is (see the above formula (9)). Further, in wireless power transmission, a higher voltage allows transmission of a larger electric power and hence provides a higher power transmission efficiency. Note that the upper limit voltage of the capacitor 6 may need to be not less than the second voltage Vc2.

While the power transmitting unit 2 and the power receiving unit 4 are a serial resonance circuit in the present embodiment, these may be a parallel resonance circuit.

An AGV system S2 according to a second embodiment of the present disclosure is described below with reference to FIG. 7. FIG. 7 is a schematic view showing the structure of an AGV V7' of the AGV system S2 according the second embodiment. In FIG. 7, the elements that are the same as or similar to those of the AGV V (see FIG. 1B) according to the first embodiment are denoted by the same reference signs. Since the structures of the entire AGV system S2 and the power transmitter A are the same as those of the AGV system S1 according to the first embodiment, illustration and description of these are omitted. The AGV system S2 differs from the AGV system S1 according to the first embodiment in that the AGV V' is provided with a robot arm 9.

The robot arm 9 is for loading and unloading an object W and attached to the body of the AGV V'. The position for attaching the robot arm 9 is not limited. The robot arm 9 loads an object while the AGV V' is stopped at a stop position H1 and unloads an object W while the AGV V' is stopped at a stop position H2. The electric power for driving the robot arm 9 is supplied from the capacitor 6. Since the robot arm 9 as well as the motor 8 consumes the electric energy stored in the capacitor 6 in the second embodiment, the distance that the AGV V' travels may be set shorter than that in the first embodiment.

The electric energy E3 consumed by the operation of the robot arm 9 is:

$$E3 = Ir \cdot Vr \cdot Tr \qquad (13)$$

where Ir is a drive current, Vr is a drive voltage, and Tr is driving time for driving the robot arm 9.

Considering the electric energy E3 consumed by the operation of the robot arm 9, E2+E3≤E1 may need to be satisfied. The following formula (14) is derived from the formulae (9), (10) and (13), and when the distance Dx satisfies the condition represented by the formula (14), E2+E3≤E1 holds.

$$Dx \leq X \cdot \{Cc \cdot (Vc2^2 - Vc1^2) - \lambda \cdot Vr \cdot Ir \cdot Tr\} / (2 \cdot Id \cdot Vd) \qquad (14)$$

The driving time Tr may be the stopping time T, assuming that the robot arm 9 operates continuously all through the stopping time.

For example, if the drive voltage Vr is 24 V, the drive current Ir is 15 A and the driving time Tr is 20 s in the above formula, Dx≤29.7 m.

The second embodiment provides the same advantages as those of the first embodiment. In some examples, a conveyor may be attached to an AGV V instead of the robot arm 9 such that an object W can be transferred between the conveyor of the AGV and another conveyor placed at a stop position H. In this case, the drive voltage Vr and the drive current Ir for driving the conveyor of the AGV V may be used to compute the distance Dx based on the above formula (14). The robot arm 9 and the conveyor attached to the AGV V correspond to a loading/unloading portion.

While the first and second embodiments describe the case where the high-frequency power source device 1 is a constant voltage source that outputs a high-frequency voltage of a constant magnitude, the present disclosure is not limited to this. An arrangement that uses a constant current source outputting a current of a constant magnitude as the high-frequency power source device 1 is described below as a third embodiment.

FIGS. 8A and 8B are drawings for describing an AGV system S3 according to the third embodiment. FIG. 8A is a drawing for describing the details of a power transmitter A' and a power receiver B' of the AGV system S3. FIG. 8B is a circuit diagram showing an internal structure of an inverter circuit 12a. In FIG. 8A, the elements that are the same as or similar to those of the power transmitter A and the power receiver B (see FIG. 2) according to the first embodiment are denoted by the same reference signs. Since the structures of the entire AGV system S3 and the schematic structures of the power transmitter A' and the AGV V are the same as those of the AGV system S1 (see FIG. 1A) according to the first embodiment, illustration and description of these are omitted. The AGV system S3 differs from the AGV system S1 according to the first embodiment in that the high-frequency power source device 1' of the power transmitter A' is a constant current source and the power receiving unit 4' of the power receiver B' is a parallel resonance circuit.

The high-frequency power source device 1' supplies high-frequency power to the power transmitting unit 2. The high-frequency power source device 1' is a constant current source that outputs a high-frequency current of a constant magnitude. The high-frequency power source device 1' includes an inverter circuit 12a instead of the inverter circuit 12.

As shown in FIG. 8B, the inverter circuit 12a includes a switching element Qs, a diode D1, inductors L1, L2 and L3 and capacitors C1, C2, C3, C4 and C10. The switching element Qs, diode D1, inductors L1 and L3, and capacitors C1, C3, C4, and C10 constitute a circuit similar to a so-called class E amplifier. A class E amplifier receives input of DC power and generates and outputs high-frequency power.

The capacitor C10 is connected in parallel to the DC power source device 11 and smooths the DC voltage input from the DC power source device 11.

The inductor L1 is connected in series between the output terminal on the high potential side of the DC power source device 11 and the switching element Qs. Due to the DC power source device 11 outputting a constant DC voltage, the inductor L1 supplies a constant DC current to the switching element Qs.

The switching element Qs switches between an on state and an off state according to a high-frequency control signal input from a control circuit (not shown). In the present embodiment, a MOSFET is used as the switching element Qs. The switching element Qs is not limited to a MOSFET, and may be a bipolar transistor, IGBT or the like. The drain terminal of the switching element Qs is connected to one terminal (terminal different from the one connected to the output terminal of the DC power source device 11) of the inductor L1. The source terminal of the switching element Qs is connected to the output terminal on the low potential side of the DC power source device 11. The gate terminal of the switching element Qs receives input of the high-frequency control signal from the control circuit. The high-frequency control signal is a pulse signal that repeats a high level and a low level at a switching frequency $f_0$. The switching element Qs enters the off state when the high-frequency control signal is at the low level, and enters the on state when the high-frequency control signal is at the high level.

The diode D1 is a so-called flywheel diode and is connected in reverse parallel between the drain terminal and the source terminal of the switching element Qs. That is, the anode terminal of the diode D1 is connected to the source terminal of the switching element Qs, and the cathode terminal of the diode D1 is connected to the drain terminal of the switching element Qs. The diode D1 is for preventing a high voltage in the reverse direction caused by a counter-electromotive force generated due to the switching of the switching element Qs from being applied to the switching element Qs. When the switching element Qs has a function of performing the operation of the diode in its interior, the diode D1 may not be provided.

The capacitor C1 is connected in parallel to the switching element Qs and stores electrical energy due to current flowing when the switching element Qs is in the off state. After the voltage across the capacitor C1 reaches its peak, the capacitor C1 discharges the electrical energy. The switching element Qs switches from the off state to the on state at the timing when the voltage across the capacitor C1 reaches zero.

The inductor L3 and the capacitor C3 are connected in series so as to constitute a resonance circuit LC3. The inductor L3 and the capacitor C3 are designed such that the resonant frequency matches the switching frequency $f_0$. The resonance circuit LC3 is connected in series between the connection point of the drain terminal of the switching element Qs and one terminal of the inductor L1, and the power transmitting unit 2. Due to the resonance characteristic of the resonance circuit LC3, the output current is in the form of a sine wave with the resonant frequency (switching frequency $f_0$). The resonance circuit LC3 corresponds to a "first resonance circuit".

The capacitor C4 is connected to the output side of the resonance circuit LC3 so as to be in parallel with the DC power source device 11. The capacitor C4, the inductor L3, and the capacitor C3 function as an impedance matching circuit. The capacitor C3 cuts the DC component from the high-frequent current output from the high-frequency power source device 1'.

According to the configuration above, the class E amplifier including the switching element Qs, diode D1, inductors L1 and L3, and capacitors C1, C3, C4 and C10 generates and outputs a high-frequency current with the switching frequency $f_0$ due to the switching element Qs switching according to the high-frequency control signal input from the control circuit.

Also, in the inverter circuit 12a of the present embodiment, the resonance circuit LC2 in which the inductor L2 and the capacitor C2 are connected in series is connected in parallel to the switching element Qs. The inductor L2 and the capacitor C2 are designed such that the resonant frequency matches a frequency that is two times the switching frequency $f_0$. The resonance circuit LC2 has a low impedance with respect to a frequency component (second harmonic component) that is two times the switching frequency $f_0$, and has a high impedance with respect to a component of the switching frequency $f_0$ (fundamental component) and a frequency component (third harmonic component) that is three times the switching frequency $f_0$. The resonance circuit LC2 corresponds to a "second resonance circuit".

In combination with the resonance circuit LC2, a filter LC1 composed of the inductor L1 and the capacitor C1 is also designed so as to have a low impedance with respect to the frequency component (second harmonic component) that is two times the switching frequency $f_0$, and to have a high impedance with respect to the component (fundamental component) of the switching frequency $f_0$ and the frequency component (third harmonic component) that is three times the switching frequency $f_0$. The capacitance of the capacitor C1 is designed with consideration given to the capacitance component inside of the switching element Qs.

According to the configuration above, the second harmonic component in the generated high-frequency current flows in the resonance circuit LC2, and thus the voltage generated due to the second harmonic component current between the drain and source of the switching element Qs can be suppressed.

The power receiving unit 4' constitutes a parallel resonance circuit due to a resonance capacitor Cr being connected in parallel to a power-receiving coil Lr. Similarly to the power-transmitting coil Lt and the resonance capacitor Ct, the power-receiving coil Lr and the resonance capacitor Cr are designed such that the resonant frequency matches the frequency $f_0$ (switching frequency $f_0$) of the high-frequency power supplied by the high-frequency power source device 1'. If the frequency $f_0$ of the high-frequency current output by the high-frequency power source device 1' is high, the floating capacitance between the windings of the power-receiving coil Lr may be used as the resonance capacitor Cr.

In the present embodiment, the following formula (15) is obtained by performing conversion to an equivalent circuit similar to that shown in FIG. 3 of the first embodiment and performing calculation.

$$I_2 = \frac{j\omega k \sqrt{L_t \cdot L_r}}{j\omega \cdot L_r} \times I_1 = k\sqrt{\frac{L_t}{L_r}} \times I_1 \qquad (15)$$

As long as the distance between the power-transmitting coil Lt and the power-receiving coil Lr does not change, the coupling coefficient k does not change. Accordingly, according to formula (15) above, the magnitude of the current $I_2$ output from the power receiving unit 4 is proportional to the magnitude of the current $I_1$ input to the power transmitting unit 2. The current $I_1$ input to the power transmitting unit 2 is the output current $I_1$ of the high-frequency power source device 1'. If the DC voltage output by the DC power source device 11 is constant, the magnitude of the output current $I_1$ of the high-frequency power source device 1' is constant. Accordingly, the magnitude of the output current $I_2$ of the power receiving unit 4 is constant, regardless of the impedance or the like of the load that is connected. That is, the output of the power receiving unit 4 can be considered as a constant current source that outputs the current $I_2$ of a constant magnitude. Since the magnitude of the output current $I_2$ of the power receiving unit 4 is constant, the current rectified and smoothed by the rectifying/smoothing circuit 5 is also constant. Thus, the current supplied to the capacitor 6 is constant regardless of the state of charge of the capacitor 6. That is, similarly to the first embodiment, the capacitor 6 is charged with a constant current.

Thus, the third embodiment also provides the same advantages as those of the first embodiment. In the third embodiment, the power transmitting unit 2 is a serial resonance circuit and the power receiving unit 4' is a parallel resonance circuit. Further, the high-frequency power source device 1' outputs a high-frequency voltage of a constant magnitude to the power transmitting unit 2, and power transmission from the power transmitting unit 2 to the power receiving unit 4' is performed by magnetic field resonance. Thus, the output of the power receiving unit 4' is equivalent to the output of the constant current source. Thus, the current output to the capacitor 6 is constant regardless of the charge state of the capacitor 6. That is, the capacitor 6 is charged with a constant current.

According to the third embodiment, the inverter circuit 12a can output a high-frequency current of a constant magnitude to the power transmitting unit 2 by inputting a high-frequency control signal to one switching element Qs. Because it is not necessary to provide dead time in the high-frequency control signal, the drive circuit for outputting the high-frequency control signal to the switching element Qs can be given a simple configuration.

According to the third embodiment, a resonance circuit LC2 composed of the inductor L2 and the capacitor C2 is connected in parallel to the switching element Qs of the inverter circuit 12a. The resonance circuit LC2 has a low impedance with respect to a frequency component (second harmonic component) that is two times the switching frequency $f_0$, and has a high impedance with respect to a component of the switching frequency $f_0$ (fundamental component) and a frequency component (third harmonic component) that is three times the switching frequency $f_0$. The second harmonic component in the generated high-frequency current flows in the resonance circuit LC2, and thus the voltage generated due to the second harmonic component current between the drain and source of the switching element Qs can be suppressed. Thus, the switching element Qs does not need to have a high breakdown voltage.

While the power transmitting unit 2 is a serial resonance circuit and the power receiving unit 4 is a parallel resonance circuit in the third embodiment, the power transmitting unit 2 may be a parallel resonance circuit and the power receiving unit 4 may be a serial resonance circuit. As another configuration, the capacitor 6 may be charged with a constant current.

FIG. 9A shows a variation of the power receiver B' according to the third embodiment. In FIG. 9A, the elements that are the same as or similar to those of the power receiver B' (see FIG. 8A) according to the third embodiment are denoted by the same reference signs. The power receiver B' shown in FIG. 9A differs from the power receiver B' shown in FIG. 8A in that it includes a power receiving unit 4 (See FIG. 2) instead of the power receiving unit 4', and a voltage-current conversion circuit 10 is provided between the power receiving unit 4 and the rectifying/smoothing circuit 5.

The voltage-current conversion circuit 10 converts a voltage output into a current output. The voltage-current conversion circuit 10 is a circuit obtained by arranging two inductors L11 and L12 and a capacitor C11 in a T shape. The inductor L11 and the inductor L12 are connected in series to each other, and are connected in series between the power receiving unit 4 and the rectifying/smoothing circuit 5. Also, the capacitor C11 is connected in parallel to the connection point between the inductor L11 and the inductor L12. The inductances and the capacitance are determined such that the magnitudes of the impedances of the inductors L11 and L12 and the capacitor C11 at the switching frequency $f_0$ become equal.

In the present embodiment, since the power transmitting unit 2 and the power receiving unit 4 are both a serial resonance circuit, the following formula (16) is obtained from the formulae (7) and (3) above by performing conversion to an equivalent circuit similar to that shown in FIG. 3 of the first embodiment and performing calculation.

$$I_1 = \frac{1}{Z2} \times V_2 \quad (16)$$
$$\therefore V_2 = Z2 \times I_1 = j\omega k \sqrt{L_t \cdot L_r} \times I_1$$

As long as the distance between the power-transmitting coil Lt and the power-receiving coil Lr does not change, the coupling coefficient k does not change. Accordingly, according to formula (16) above, the magnitude of the voltage $V_2$ output from the power receiving unit 4 is proportional to the magnitude of the current $I_1$ input to the power transmitting unit 2. The current $I_1$ input to the power transmitting unit 2 is the output current $I_1$ of the high-frequency power source device 1'. If the DC voltage output by the DC power source device 11 is constant, the magnitude of the output current $I_1$ of the high-frequency power source device 1' is constant. Accordingly, the magnitude of the output voltage $V_2$ of the power receiving unit 4 is constant, regardless of the impedance or the like of the load that is connected. That is, the output of the power receiving unit 4 can be considered as a constant voltage source that outputs the voltage $V_2$ of a constant magnitude. Since the voltage-current conversion circuit 10 converts a voltage output into a current output, it outputs a current $I_2'$ of a constant magnitude by receiving an input of a voltage $V_2$ of a constant magnitude from the power receiving unit 4. Since the magnitude of the output current $I_2'$ of the voltage-current conversion circuit 10 is constant, the current rectified and smoothed by the rectifying/smoothing circuit 5 is also constant. Thus, the current supplied to the capacitor 6 is constant regardless of the state of charge of the capacitor 6. That is, in this variation again, the capacitor 6 is charged with a constant current.

Thus, this variation also provides the same advantages as those of the third embodiment.

While the voltage-current conversion circuit 10 is described, in this variation, as a circuit in which two inductors L11 and L12 and a capacitor C11 are arranged in a T shape, the circuit configuration of the voltage-current conversion circuit 10 is not limited to the description above. For example, the voltage-current conversion circuit 10 may be configured as a circuit in which one inductor and two capacitors are arranged in a T shape, a circuit in which two inductors and one capacitor are arranged in a n shape, or a circuit in which one inductor and two capacitors are arranged in a n shape.

Also, the voltage-current conversion circuit 10 is not limited to a circuit in which an inductor and a capacitor are combined. It may be only necessary that the voltage-current conversion circuit 10 converts the voltage output from the power receiving unit 4 into a current output. For example, an voltage-current conversion circuit 10' as shown in FIG. 9B may be used, which includes a transmission line TL connected in series between the power receiving unit 4 and the rectifying/smoothing circuit 5. For example, a coaxial cable may be used as the transmission line TL. Note that the transmission line TL' is not limited to a coaxial cable, and may be a coaxial tube, a line formed on a substrate, or the like. The length of the transmission line TL may be set to about one-fourth of the transmission wavelength in the transmission line TL of the fundamental wave of the high frequency wave (i.e., the high frequency wave output by the high-frequency power source device 1') input by the power receiving unit 4.

While the power transmitting unit 2 and the power receiving unit 4 are a serial resonance circuit in the present variation, these may be a parallel resonance circuit.

While the high-frequency power source device 1' of the third embodiment is described above as including the inverter circuit 12a, the high-frequency power source device 1' may include other types of inverter circuit. As one example, the high-frequency power source device 1' may include, instead of the inverter circuit 12a, an inverter circuit 12b (see FIG. 10A) that uses a so-called class E amplifier and does not include the resonance circuit LC2. The inverter circuit 12b can also output a high-frequency current of a constant magnitude by inputting a high-frequency control signal to the switching element Qs. Because it is not necessary to provide dead time in the high-frequency control signal, the drive circuit for outputting the high-frequency control signal to the switching element can be given a simple configuration. In this case, the voltage between the drain and the source of the switching element Qs cannot be suppressed, and therefore the switching element Qs may need to have a high breakdown voltage.

As another example, the high-frequency power source device 1' may include an inverter circuit 12c as shown in FIG. 10B, which is obtained by replacing the inductor L1 with a transmission line Kin the inverter circuit 12b in FIG. 10A. The transmission line K is a line for transmitting power and connected in series between the output terminal on the high-potential side of the DC power source device 11 and the drain terminal of the switching element Qs. In the present variation, a coaxial cable is used as the transmission line K. The transmission line K is not limited to a coaxial cable, and for example, may be a coaxial tube, a line formed on a substrate, or the like. The length of the transmission line K may be set to about one-fourth of the transmission wavelength in the transmission line K of the fundamental wave of the high frequency wave output by the inverter circuit 12c. That is, a transmission line similar to the transmission line TL' of the voltage-current conversion circuit 10' described above may be used.

The impedance on the transmission line K side viewed from the drain terminal of the switching element Qs is a low impedance with respect to a frequency component that is equal to an even number times the switching frequency $f_0$, and is a high impedance with respect to the component of the switching frequency $f_0$ (fundamental wave component) and a frequency component that is equal to an odd number times the switching frequency $f_0$. The inverter circuit 12c can also output a high-frequency current of a constant magnitude by inputting a high-frequency control signal to the switching element Qs. Because it is not necessary to provide dead time in the high-frequency control signal, the drive circuit for outputting the high-frequency control signal to the switching element can be given a simple configuration. Also, because the transmission line K has a low impedance with respect to the even-numbered harmonic component, the even-numbered harmonic component flows in the transmission line K and can suppress the voltage that occurs due to the even-numbered harmonic component current between the drain and the source of the switching element Qs.

As another example, the high-frequency power source device 1' may include an inverter circuit 12d as shown in FIG. 10C, which is obtained by providing a transmission line portion K' in the inverter circuit 12b shown in FIG. 10A. The transmission line portion K' attenuates harmonic components of a predetermined order from the high-frequency wave generated by the inverter circuit 12d. The transmission line portion K' includes a transmission line K1 and a transmission line K2.

The transmission line K1 has one end connected to the drain terminal of the switching element Qs and the other end that is open. The transmission line K2 has one end connected to the drain terminal of the switching element Qs and the other end that is short-circuited. In the present variation, coaxial cables are used as the transmission lines K1 and K2. Note that the transmission lines K1 and K2 are not limited to coaxial cables, and for example, coaxial tubes, lines formed on a substrate, or the like may be used. The length of the transmission lines K1 and K2 may be set to about one-eighth of the transmission wavelength in the transmission lines K1 and K2 of the fundamental wave of the high frequency wave output by the inverter circuit 12d. The transmission line K1 may be a "first transmission line", and the transmission line K2 may be a "second transmission line".

The impedance of the transmission line portion K' becomes infinitely large at the switching frequency $f_0$ and frequencies that are equal to $f_0$ multiplied by an odd number, and the impedance reaches 0Ω at frequencies that are equal to $f_0$ multiplied by an even number. That is, in the transmission line portion K', currents at the fundamental wave of the high frequency wave generated by the inverter circuit 12d and odd-numbered harmonics (third harmonic, fifth harmonic, etc.) do not flow, and currents at even-numbered harmonics (second harmonic, fourth harmonic, etc.) flow, and thus the voltage of the harmonic component generated in the switching element Qs is attenuated. The inverter circuit 12d can also output a high-frequency current of a constant magnitude by inputting a high-frequency control signal to the switching element Qs. Because it is not necessary to provide dead time in the high-frequency control signal, the drive circuit for outputting the high-frequency control signal to the switching element can be given a simple configuration. Also, the even-numbered harmonic components flow in the transmission line portion K', and thus the voltage generated due to the second harmonic component current between the drain and source of the switching element Qs can be suppressed.

An inverter circuit other than the inverter circuits 12a-12d may be used in the present disclosure as an inverter circuit outputting a high-frequency current of a constant magnitude.

In the first through the third embodiments, a power transmitter A (A') is placed at every stop position H, which means that every "stop position" is a "charge position". However, the present disclosure is not limited to this configuration. That is, the circulation route may include a stop position H that is not a "charge position", i.e., a stop position at which a power transmitter A (A') is not placed and charging is not performed.

FIG. 11 is a schematic plan view showing the overall structure of an AGV system S4 according to a fourth embodiment. In FIG. 11, the elements that are the same as or similar to those of the AGV system S1 according to the first embodiment are denoted by the same reference signs. Since these elements are the same as or similar to those of the AGV system S1 according to the first embodiment, illustration and description of these are omitted. The AGV system S4 differs from the AGV system S1 according to the first embodiment in that it includes a stop position H3 in addition to the stop positions H1 and H2.

The stop position H3 is provided in the middle of the route R1 of the circulation route R. The AGV V stops at the stop position H3 as well. At the stop position H3, processing is performed with an object W loaded. In the state shown in FIG. 11, the AGV V2 is stopped at the stop position H3. A power transmitter A is not placed at the stop position H3. That is, the stop position H3 corresponds to the "stop position" but does not correspond to the "charge position".

In the present embodiment, the AGV V is charged when it is stopped at the stop position H1 or the stop position H2, but is not charged when stopped at the stop position H3. Thus, similarly to the first embodiment, in the circulation route R, each of the distance of the route R1 from the stop position H1 to the stop position H2 and the distance of the route R2 from the stop position H2 to the stop position H1 is set to satisfy the formula (11).

Specifically, in the present embodiment, each of the distances of the route R1 and the route R2 between the stop positions H1 and H2 where charging is performed is set to satisfy the formula (11). Thus, the electric energy consumed in traveling along the route R1 and the route R2 does not exceed the electric energy charged when the AGV is stopped, so that the amount of electricity stored in the capacitor 6 does not drop below a predetermined level. The present embodiment provides the same advantages as those of the first embodiment.

FIG. 12 is a schematic plan view showing the overall structure of an AGV system S5 according to a fifth embodiment. In FIG. 12, the elements that are the same as or similar to those of the AGV system S1 according to the first embodiment are denoted by the same reference signs. Since these elements are the same as or similar to those of the AGV system S1 according to the first embodiment, illustration and description of these are omitted. The AGV system S5 differs from the AGV system S1 according to the first embodiment in that it includes a stop position H3 instead of the stop position H2.

A power transmitter A is not placed at the stop position H3, so that charging is not performed at the stop position H3, though unloading of an object W from the AGV is performed. That is, the stop position H3 corresponds to the "stop position" but does not correspond to the "charge position". In the state shown in FIG. 12, the AGV V3 is stopped at the stop position H3.

In the present embodiment, the AGV V is charged when it is stopped at the stop position H1, but is not charged when stopped at the stop position H3. That is, the "charge position" is only the stop position H1. Thus, the distance of the entire circulation route R (the distance around the circulation route R starting from the stop position H1 and returning to the stop position H1) is set to satisfy the above formula (11).

Specifically, in this embodiment, the distance from the stop position H1 where charging is performed to the stop position H1 where next charging is performed (the distance around the circulation route R) is set to satisfy the above formula (11). Thus, the electric energy consumed in traveling along the circulation route R does not exceed the electric energy charged when the AGV is stopped, so that the amount of electricity stored in the capacitor 6 does not drop below a predetermined level. The present embodiment provides the same advantages as those of the first embodiment.

The AGV system according to the present disclosure is not limited to the foregoing embodiments. Various design modifications can be made to the specific configurations of each part of the AGV system according to the present disclosure.

Variations of the foregoing embodiments are described below as clauses.

Clause 1.
A vehicle system comprising:
a power transmitter (A) placed at one of at least one charge position; and
a vehicle (V) including:
a power receiver (B) wirelessly receiving first electric power from the power transmitter, and outputting second electric power deriving from the first electric power;
a capacitor (6) storing the second electric power output by the power receiver such that the capacitor is charged from a first voltage Vc1 to a second voltage Vc2; and
a motor (8) driven by the second electric power from the capacitor, wherein the vehicle travels a distance Dx along a route (R) of the vehicle from one to a next one of the at least one charge position on the route, the distance Dx satisfying a relationship:

$$Dx \le X \cdot \alpha \cdot Cc \cdot (Vc2^2 - Vc1^2)/(2 \cdot Id \cdot Vd)$$

where Cc is a capacitance of the capacitor,
α is a coefficient not greater than 1,
X is a speed of the vehicle,
Vd is a drive voltage that drives the motor, and
Id is a drive current that drives the motor.

Clause 2.
The vehicle system according to clause 1, wherein the vehicle stops at a plurality of stop positions (H), the stop positions including the at least one charge position,
the vehicle includes a loading/unloading portion (9) that loads or unloads an object when the vehicle is stopped at one of the stop positions, and
the distance Dx further satisfies a relationship:

$$Dx \le X \cdot \{\alpha \cdot Cc \cdot (Vc2^2 - Vc1^2) - 2 \cdot Vr \cdot Ir \cdot Tr\}/(2 \cdot Id \cdot Vd)$$

where Vr is a drive voltage that drives the loading/unloading portion,
Ir is a drive current that drives the loading/unloading portion, and
Tr is time for driving the loading/unloading portion.

Clause 3.
The vehicle system according to clause 1 or 2, wherein the vehicle further includes a DC-DC converter circuit that converts a voltage applied to the motor into the drive voltage Vd, and
the distance Dx is set such that the first voltage Vc1 is not less than the drive voltage Vd.

Clause 4.
The vehicle system according to any one of clauses 1 to 3, wherein the coefficient α is 1.

Clause 5.
The vehicle system according to any one of clauses 1 to 3, wherein the coefficient α is 0.7 to 0.9.

Clause 6.
The vehicle system according to any one of clauses 2 to 5, wherein each of the stop positions is one of the at least one charge position.

Clause 7.
The vehicle system according to any one of clauses 2 to 5, wherein the stop positions include only single charge position.

Clause 8.
The vehicle system according to any one of clauses 1 to 7, wherein the power transmitter outputs a high-frequency current having a frequency of 50 kHz or higher, and a charging current for the capacitor is 50 A or more.

Clause 9.
The vehicle system according to any one of clauses 1 to 8, wherein the capacitor is charged with a constant current.

Clause 10.
The vehicle system according to any one of clauses 1 to 9, wherein the power transmitter comprises:
a high-frequency power source device (1) that outputs a constant high-frequency voltage;
a power-transmitting coil (Lt) connected to the high-frequency power source device; and
a resonance capacitor (Ct) connected in series to the power-transmitting coil,
wherein the power receiver comprises:
a power-receiving coil (Lr) magnetically coupled to the power-transmitting coil; and a resonance capacitor (Cr) connected in series to the power-receiving coil, and wherein power transmission from the power transmitter to the power receiver is performed by magnetic field resonance.

Clause 11.

The vehicle system according to any one of clauses 1 to 9, wherein the power transmitter comprises:

a high-frequency power source device (1) that outputs a constant high-frequency current;

a power-transmitting coil (Lt) connected to the high-frequency power source device, and a resonance capacitor (Ct) connected in series to the power-transmitting coil, and wherein the power receiver comprises:

a power-receiving coil (Lr) magnetically coupled to the power-transmitting coil; and a resonance capacitor (Cr) connected in parallel to the power-receiving coil, wherein power transmission from the power transmitter to the power receiver is performed by magnetic field resonance.

Clause 12.

The vehicle system according to any one of clauses 1 to 9, wherein the power transmitter comprises:

a high-frequency power source device (1) that outputs a constant high-frequency current;

a power-transmitting coil (Lt) connected to the high-frequency power source device, and a resonance capacitor (Ct) connected in series to the power-transmitting coil, and wherein the power receiver comprises:

a power-receiving coil (Lr) magnetically coupled to the power-transmitting coil; and a resonance capacitor (Cr) connected in series to the power-receiving coil, and a voltage-current conversion circuit (10) that converts a voltage output from the power-receiving coil into a current output, and wherein power transmission from the power transmitter to the power receiver is performed by magnetic field resonance.

Clause 13.

The vehicle system according to clause 11 or 12, wherein the high-frequency power source device comprises:

a DC power source device (11) that outputs a DC voltage;

a switching element (Qs) that performs a switching operation based on an inputted high-frequency control signal;

an inductor (L1) connected in series between the DC power source device and the switching element;

a first resonance circuit (LC3) that is connected in series between the power-transmitting coil and a connection point of the switching element and the inductor, a resonant frequency of the first resonance circuit being a frequency of the high-frequency control signal; and a second resonance circuit (LC2) that is connected in parallel to the switching element, a resonant frequency of the second resonance circuit matching a frequency that is two times a frequency of the high-frequency control signal.

Clause 14.

The vehicle system according to any one of clauses 10 to 13, wherein the power-receiving coil is disposed on a side surface of a body of the vehicle, and includes a coil surface substantially perpendicular to a floor surface, and the power-transmitting coil is disposed on the power transmitter, and includes a coil surface substantially perpendicular to the floor surface.

Clause 15.

The vehicle system according to any one of clauses 10 to 13, wherein the power-receiving coil is disposed on a bottom surface of a body of the vehicle, and includes a coil surface substantially parallel to a floor surface, and the power-transmitting coil is disposed on a floor surface at one of the at least one charge position, and includes a coil surface substantially parallel to the floor surface.

The invention claimed is:

1. A system comprising:
a route that includes a plurality of stop positions for a vehicle, at least one of the stop positions includes a power transmitter; and
the vehicle including:
a power receiver that wirelessly receives a first electric power from the power transmitter when the vehicle is at the at least one stop position, and that outputs a second electric power deriving from the first electric power;
a capacitor electrically connected to the power receiver to receive the second electric power output from the power receiver, the capacitor storing the second electric power such that the capacitor is charged from a first voltage Vc1 to a second voltage Vc2; and
a motor electrically connected to the capacitor and receiving the second electric power from the capacitor whereby the motor is driven by the second electric power from the capacitor,
a control device connected to and that controls the motor, the control device is programmed to control the motor so that the vehicle automatically travels a distance Dx along the route from the at least one stop position to a next one of the stop positions, the distance Dx satisfying a relationship:

$$Dx <= X*\alpha*Cc*(Vc2^2 - Vc1^2)/(2*Id*Vd)$$

where Cc is a capacitance of the capacitor,
α is a scaling coefficient greater than zero and not greater than 1 to quantify capacitance degradation,
X is a speed of the vehicle greater than zero,
Vd is a drive voltage that drives the motor, and
Id is a drive current that drives the motor,
wherein the vehicle includes a DC-DC converter circuit electrically connected to the capacitor and to the motor, the DC-DC converter converts a voltage applied to the motor into the drive voltage Vd,
the distance Dx is set such that the first voltage Vc1 is not less than the drive voltage Vd, the vehicle further includes a loading portion that is configured to load an object onto the vehicle, unload an object from the vehicle, or both when the vehicle is stopped at one of the stop positions, and
the distance Dx further satisfies a relationship:

$$Dx <= X*\{\alpha*Cc*(Vc2^2 - Vc1^2) - 2*Vr*Ir*Tr\}/(2*Id*Vd)$$

where Vr is a drive voltage that drives the loading portion,
Ir is a drive current that drives the loading portion, and
Tr is time for driving the loading portion.

2. The system according to claim 1, wherein the scaling coefficient α is 1.

3. The system according to claim 1, wherein the scaling coefficient α is 0.7 to 0.9.

4. The system according to claim 1, wherein each one of the stop positions includes one of the power transmitters.

5. The system according to claim 1, wherein the stop positions include only a single one of the power transmitters.

6. The system according to claim 1, wherein the power transmitter outputs a current having a frequency of 50 kHz or higher, and a charging current for the capacitor is 50 A or more.

7. The system according to claim 1, wherein the power receiver is configured to output a constant current.

8. The system according to claim 1, wherein the power transmitter comprises: a high-frequency power source device that outputs a constant high-frequency voltage; a power-transmitting coil connected to the high-frequency power source device; and a resonance capacitor connected in series to the power-transmitting coil, wherein the power receiver comprises: a power-receiving coil magnetically coupled to the power-transmitting coil; and a resonance capacitor connected in series to the power-receiving coil, and wherein power transmission from the power transmitter to the power receiver is performed by magnetic field resonance.

9. The system according to claim 8, wherein the power-receiving coil is disposed on a side surface of a body of the vehicle, and includes a coil surface substantially perpendicular to a floor surface, and the power-transmitting coil is disposed on the power transmitter, and includes a coil surface substantially perpendicular to the floor surface.

10. The system according to claim 8, wherein the power-receiving coil is disposed on a bottom surface of a body of the vehicle, and includes a coil surface substantially parallel to a floor surface, and the power-transmitting coil is disposed on the floor surface at the at least one stop position, and includes a coil surface substantially parallel to the floor surface.

11. The system according to claim 1, wherein the power transmitter comprises: a high-frequency power source device that outputs a constant high-frequency current; a power-transmitting coil connected to the high-frequency power source device, and a resonance capacitor connected in series to the power-transmitting coil, and wherein the power receiver comprises: a power-receiving coil magnetically coupled to the power-transmitting coil; and a resonance capacitor connected in parallel to the power-receiving coil, wherein power transmission from the power transmitter to the power receiver is performed by magnetic field resonance.

12. The system according to claim 11, wherein the high-frequency power source device comprises: a DC power source device that outputs a DC voltage; a switching element that performs a switching operation based on an inputted high-frequency control signal; an inductor connected in series between the DC power source device and the switching element; a first resonance circuit that is connected in series between the power-transmitting coil and a connection point of the switching element and the inductor, a resonant frequency of the first resonance circuit being a frequency of the high-frequency control signal; and a second resonance circuit that is connected in parallel to the switching element, a resonant frequency of the second resonance circuit matching a frequency that is two times a frequency of the high-frequency control signal.

13. The system according to claim 1, wherein the power transmitter comprises: a high-frequency power source device that outputs a constant high-frequency current; a power-transmitting coil connected to the high-frequency power source device, and a resonance capacitor connected in series to the power-transmitting coil, and wherein the power receiver comprises: a power-receiving coil magnetically coupled to the power-transmitting coil; and a resonance capacitor connected in series to the power-receiving coil, and a voltage-current conversion circuit that converts a voltage output from the power-receiving coil into a current output, and wherein power transmission from the power transmitter to the power receiver is performed by magnetic field resonance.

* * * * *